(12) United States Patent
Ro et al.

(10) Patent No.: US 10,168,978 B2
(45) Date of Patent: Jan. 1, 2019

(54) WATCH TYPE TERMINAL AND METHOD FOR CONTROLLING THE SAME

(71) Applicant: LG Electronics Inc., Seoul (KR)

(72) Inventors: Jinwook Ro, Seoul (KR); Kyungin Oh, Seoul (KR); Nayeoung Kim, Seoul (KR); Mose Jueng, Seoul (KR); Jungeun Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 641 days.

(21) Appl. No.: 14/703,143

(22) Filed: May 4, 2015

(65) Prior Publication Data

US 2016/0117141 A1 Apr. 28, 2016

(30) Foreign Application Priority Data

Oct. 22, 2014 (KR) .................. 10-2014-0143508

(51) Int. Cl.
*G06F 3/048* (2013.01)
*G06F 3/14* (2006.01)
(Continued)

(52) U.S. Cl.
CPC .......... *G06F 3/1454* (2013.01); *G04G 21/04* (2013.01); *G04G 21/08* (2013.01); *G06F 3/0482* (2013.01);
(Continued)

(58) Field of Classification Search
CPC .. G06F 3/1454; G06F 3/04817; G06F 3/0482; G06F 3/0486; G06F 3/04883; G06F 15/0208; G04G 21/04; G04G 21/08
(Continued)

(56) References Cited

U.S. PATENT DOCUMENTS 7,460,764 B2 * 12/2008 Inoue ................ G04G 15/006
348/E5.102
2003/0007420 A1 1/2003 Shteyn
(Continued)

FOREIGN PATENT DOCUMENTS

JP 2003-288141 A 10/2003

OTHER PUBLICATIONS

Duet:Exploring joint interactions on a smart phone and a smart watch; ACM, p. 159-168, Apr. 26, 2014-May 1, 2014.*
(Continued)

*Primary Examiner* — Renee D Chavez
*Assistant Examiner* — Jianmei F Duckworth
(74) *Attorney, Agent, or Firm* — Dentons US LLP

(57) ABSTRACT

Disclosed is a watch type terminal including a touch screen which is capable of receiving a touch input and a control method thereof. The watch type terminal includes a main body, a wireless communication unit that communicates with an external terminal, a touch screen that includes a plurality of regions corresponding to each time, and a controller that displays information informing that content information corresponding on a copy region may be stored to the main body when a first touch input is applied to the touch screen while selection of the copy region is maintained at the external terminal, and the controller stores the content information to be mapped in a region which corresponds to a current time among the plurality of regions and displayed an icon informing that the content information has been stored in the region corresponding to the current time, when a second touch input is received.

17 Claims, 22 Drawing Sheets

(51) Int. Cl.
*G06F 3/0481* (2013.01)
*G06F 3/0482* (2013.01)
*G06F 3/0486* (2013.01)
*G06F 3/0488* (2013.01)
*G04G 21/08* (2010.01)
*G04G 21/04* (2013.01)
*G06F 15/02* (2006.01)

(52) U.S. Cl.
CPC ........ *G06F 3/0486* (2013.01); *G06F 3/04817* (2013.01); *G06F 3/04883* (2013.01); *G06F 15/0208* (2013.01)

(58) Field of Classification Search
USPC .......................................................... 715/748
See application file for complete search history.

(56) References Cited

U.S. PATENT DOCUMENTS

| | | | | |
|---|---|---|---|---|
| 2010/0162170 A1* | 6/2010 | Johns | ................ | G04G 9/06 715/834 |
| 2011/0083111 A1* | 4/2011 | Forutanpour | ......... | G06F 1/1694 715/863 |
| 2012/0030567 A1* | 2/2012 | Victor | .................. | G06F 3/0482 715/702 |
| 2012/0077436 A1* | 3/2012 | Konded | .............. | G06F 3/04883 455/41.2 |
| 2013/0058198 A1* | 3/2013 | Tu | .......................... | G04G 21/08 368/28 |
| 2013/0235704 A1* | 9/2013 | Grinberg | ................ | G04G 21/08 368/69 |
| 2014/0059169 A1* | 2/2014 | Ko | .......................... | H04W 8/24 709/217 |
| 2014/0099614 A1* | 4/2014 | Hu | ........................ | G09B 19/00 434/236 |
| 2014/0160049 A1 | 6/2014 | Shin | | |
| 2014/0347289 A1* | 11/2014 | Suh | ........................ | G06F 3/017 345/173 |
| 2015/0012861 A1* | 1/2015 | Loginov | ................. | G06F 9/543 715/770 |
| 2016/0070460 A1* | 3/2016 | Gradert | ............... | G06F 3/04883 715/771 |

OTHER PUBLICATIONS

X. Chen, et al.: "Duet: Exploring Joint Interactions on a Smart Phone and a Smart Watch", XP058046489, Proceedings of the CHI 2014 Conference, Apr. 26, 2014, pp. 159-168.

* cited by examiner

FIG. 3(a)  FIG. 3(b)
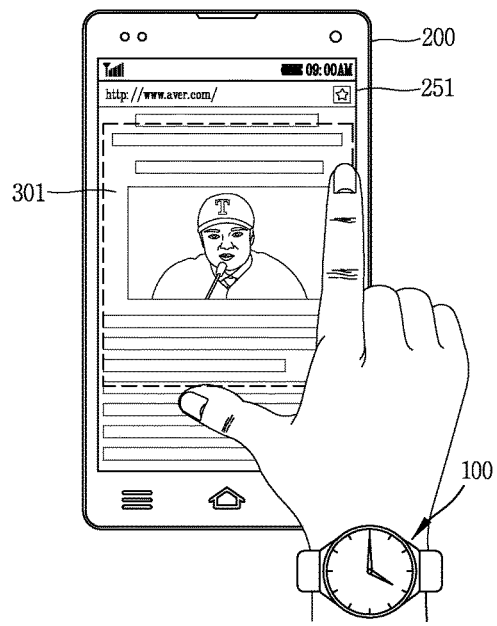
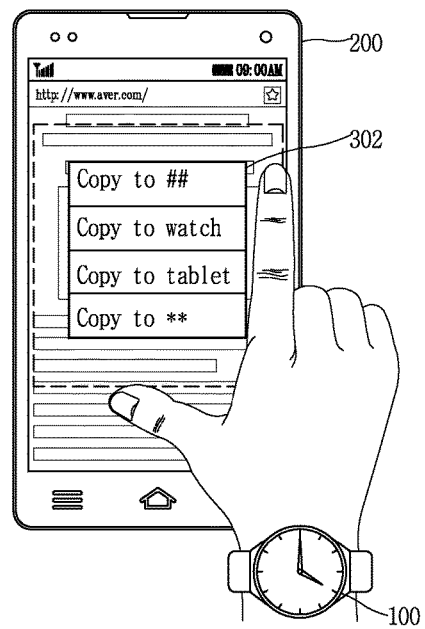
FIG. 3(c)
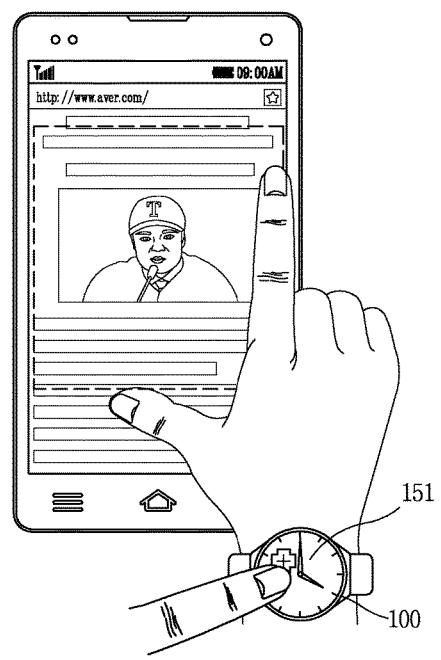

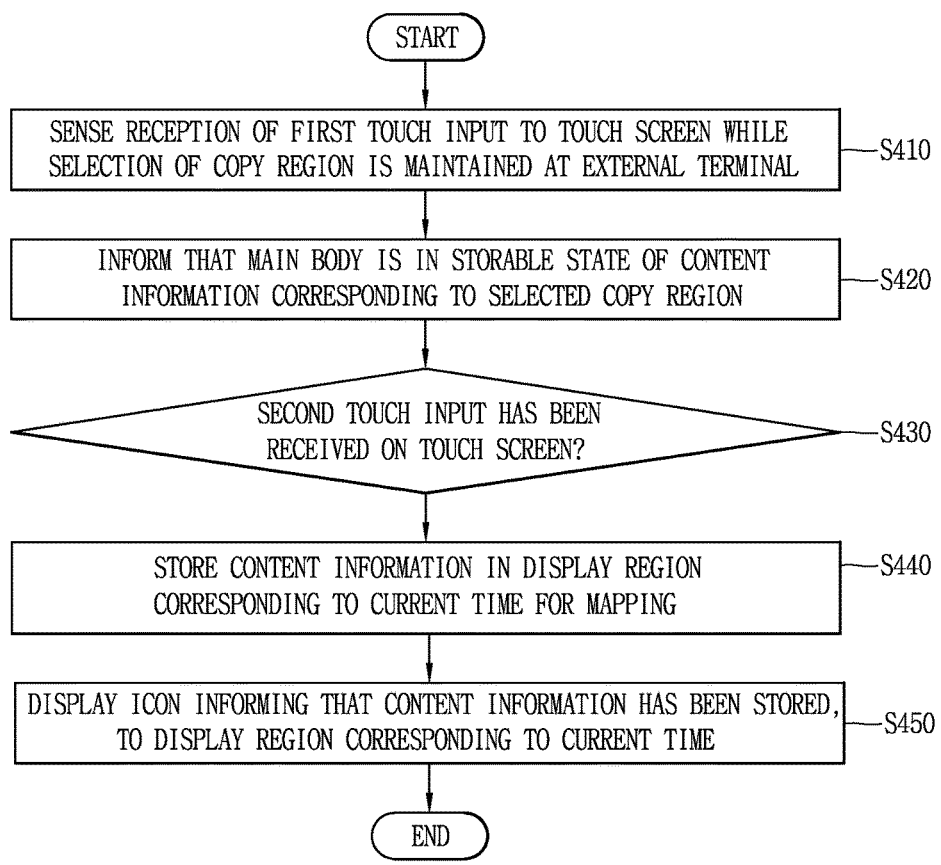

FIG. 11B(a) FIG. 11B(b) FIG. 11B(c)
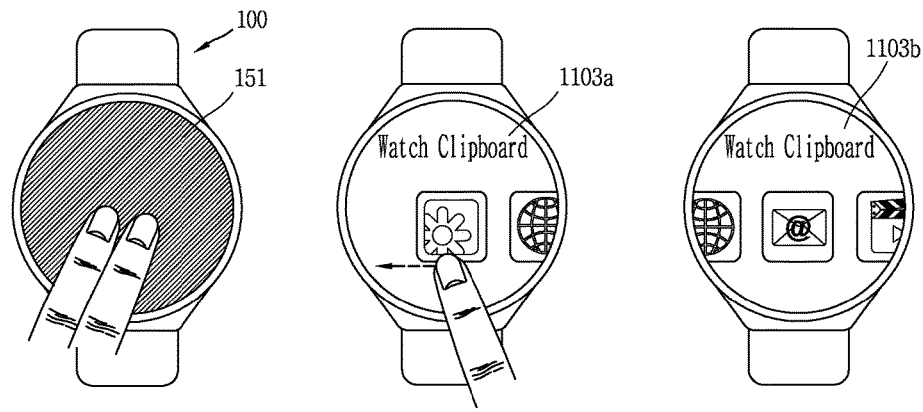
FIG. 11B(e) FIG. 11B(d)
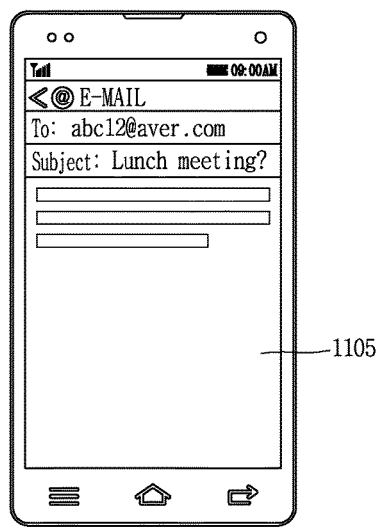
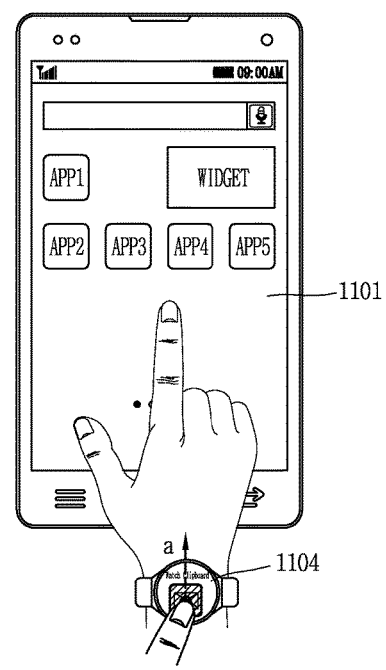

WATCH TYPE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2014-0143508, filed on Oct. 22, 2014, the content of which is incorporated by reference herein in its entirety.

BACKGROUND OF THE INVENTION

1. Field of the Invention

The present invention relates to a watch type terminal having a display unit which is capable of receiving a touch input, and a method for controlling the same.

2. Description of the Conventional Art

A terminal is broadly categorized by mobility into a mobile (portable) terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as capturing a still image or a moving image of a photographic subject, reproducing a digital audio and video compression file, playing a game, receiving a broadcast or the like. Furthermore, structural and software modifications to the mobile terminal are considered for supporting and improving functions of the mobile terminal.

Owing to such development, a recent mobile terminal has evolved into various types of designs, and especially a watch type terminal is actively developed as one of wearable devices which may be fixed to a user's body. The watch type terminal may be configured to control or communicate with other mobile terminal to transmit or receive data by being connected to the other mobile terminal.

Meanwhile, considering the watch type terminal that has a function of displaying time information, a more convenient user interface environment is required in a case where the watch type terminal is connected and operated with other terminal.

SUMMARY OF THE INVENTION

It is an object of the present invention to provide a watch type terminal and a method for controlling the same, which is capable of executing a clipboard function of taking content from an external terminal or providing stored content to the external terminal, using a touch input applied to a display unit.

It is another object of the present invention to provide a watch type terminal and a method for controlling the same, which is capable of visually displaying a content storage space so as to easily search for content taken from an external terminal.

To achieve objects of the present invention, there is provided a watch type terminal including: a main body; a wireless communication unit configured to be connected with an external terminal; a display unit configured to receive a touch input and include a plurality of regions corresponding to each time; and a controller configured to output, to the main body, information informing that content information corresponding to a copy region can be stored when a first input is received on the display unit while the copy region is continuously selected at the external terminal. The controller may be configured to store the content information for mapping in a region corresponding to a current time, among the plurality of regions, when a second input is received on the display unit, and output an icon informing that the content information has been stored in the region corresponding to the current time.

In an embodiment of the present invention, the content information corresponding to the copy region may include content included in the copy region and information of an application corresponding to the content, and the controller may be configured to control the wireless communication unit to receive content information corresponding to a copy region selected when a second touch input is released.

In an embodiment of the present invention, the controller may be configured to output information of an application corresponding to the content and an indicator indicating a region where the content information is to be stored, to the display unit when a second input is received, and the icon is an icon of an application corresponding to the content.

In an embodiment of the present invention, information on the number of content stored in a region corresponding to a current time may be displayed on the icon when there are other content information pre-stored in the region corresponding to the current time.

In an embodiment of the present invention, the controller may be configured to convert an icon marked with the number information into a plurality of movable sub-icons when a third touch input applied to the icon marked with the number information is received, and to move content information corresponding to one of the plurality of sub-icons to another region when a drag input to move the one of the plurality of sub-icons to the other region is applied.

In an embodiment of the present invention, the controller may be configured to change the copy region and content information corresponding to the copy region in response to change of a touch gesture for selecting the copy region while the first touch input is maintained, and store the content information corresponding to the changed copy region so as to be mapped with a region corresponding to a current time when the second input is received.

In an embodiment of the present invention, the controller may be configured to change the stored content information into a transmittable state when a third input is received on the display unit, and transmit the content information selected on the display unit to the external terminal while the touch gesture is maintained at the external terminal.

In an embodiment of the present invention, the transmittable state of the stored content information may be a state where the icon is displayed on the regions where the content information is stored, and when a touch input is applied to the icon, content information to be transmitted may be selected.

In an embodiment of the present invention, the controller may be configured to control the wireless communication unit to output a preview screen of content information corresponding to the icon to the external terminal when a touch input is applied to the icon while a preset touch gesture is maintained at the external terminal. Further, in another embodiment of the present invention, the controller may be configured to control the wireless communication unit to output a preview screen of content information corresponding to the icon to the external terminal when a preset touch gesture is applied to the external terminal in a state where a touch input is applied to the icon.

In an embodiment of the present invention, the controller may be configured to paste content information corresponding to the preview screen on a paste region corresponding to the touch gesture when a touch input of a first direction is applied to the display unit while the preview screen is output, and terminate the paste operation when the touch gesture is released.

In an embodiment of the present invention, the first direction may be a direction that the external terminal is positioned or a direction that has been preset based on a first touch-applied point, and the controller may be configured to cancel paste of content information corresponding to the preview screen when a touch input of a second direction opposite to the first direction is applied to the display unit while the touch gesture is maintained at the external terminal.

In an embodiment of the present invention, when an application corresponding to the selected content information is pre-executed at the external terminal, the content information corresponding to the preview screen may be pasted to the external terminal.

In an embodiment of the present invention, when an application corresponding to the selected content information is not executed at the external terminal, the controller may be configured to paste content information corresponding to the preview screen to the external terminal after executing the application corresponding to the selected content information. Further, in another embodiment of the present invention, when the application corresponding to the selected content information is not installed in the external terminal, the controller may be configured to install an application corresponding to the selected content information or output visual information inquiring as to whether to install the application in the external terminal.

In an embodiment of the present invention, the controller may be configured to output an icon of a first application corresponding to the first preview screen to the display unit while a first preview screen is output to the external terminal when the selected content information is plural, and output an icon of a second application corresponding to a second preview screen to the display unit when the first preview screen is converted into the second preview screen using the touch gesture.

In an embodiment of the present invention, the controller may be configured to convert the icon of the first application into the icon of the second application when a preset touch input is applied to the display unit while the first preview screen is output to the external terminal, and control the wireless communication unit to output the second preview screen corresponding to the icon of the second application to the external terminal in response to the conversion of the icon of the first application into the icon of the second application.

In an embodiment of the present invention, content information corresponding to the preview screen which was being output to the external terminal when the touch gesture is released, may be pasted to the external terminal.

In an embodiment of the present invention, the controller may be configured to output screen information for setting a usable time of the preview screen to the display unit when a third touch input is received on the display unit and then a drag input rotating in one direction is applied to an edge region of the display unit, and the usable time may be determined in proportion to a length of the drag input rotating in one direction.

In an embodiment of the present invention, the controller may be configured to control a list of devices connected to the external terminal to disappear when the first touch input is received in a state where the list is displayed on the external terminal as the selected state of copy region is maintained at the external terminal, and configured to initiate copy of content information corresponding to the copy region as the main body and the external terminal are connected to each other.

In an embodiment of the present invention, the controller may be configured to control the wireless communication unit to receive content stored in an application together with metadata of recently-executed content from the application when the selected copy region is an icon of the application.

In an embodiment of the present invention, the display unit may be configured to be converted from one of an on-state and off-state to another, and the controller may be configured to control a preview screen of recently-stored content information to be output to the external terminal while maintaining an off-state when a predetermined touch gesture is applied to the external terminal within a reference time while a third touch input is applied to the display unit in the off-state. The controller may be configured to convert the off-state into an on-state when the third touch input is applied to the display unit in the off-state, and to output an icon of an application corresponding to pre-stored content information to the display unit.

BRIEF DESCRIPTION OF THE DRAWING

FIGS. 3(a) to 3(f) are representative schematic views illustrating a method to take content information output to an external terminal, by a watch type terminal according to the present invention;

FIG. 4 is a representative flowchart illustrating a method to take content information output to an external terminal, by a watch type terminal according to the present invention;

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
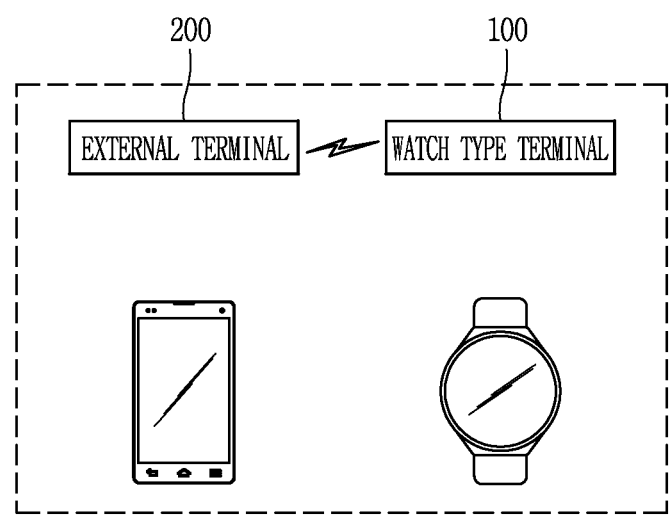
FIG. 1 is an exemplary schematic view illustrating that a watch type terminal of the present invention is connected and operated with an external terminal.

FIG. 1 is an exemplary schematic view illustrating that a watch type terminal 100 of the present invention is connected and operated with an external terminal 200. Here, the external terminal 200 may include a mobile terminal such as a portable phone, a smart phone, a laptop computer, a terminal for digital broadcast, personal digital assistances (PDA), a portable multimedia player (PMP), navigation, a slate PC, a tablet PC, an ultra book, and a wearable device (for instance, a smart watch, a smart glass, a head mounted display (HMD), and the like), or a stationary terminal such as a digital TV, a desktop computer, and a digital signage.

As shown in FIG. 1, the watch type terminal 100 may be configured to be communicable (co-operable) with the external terminal 200 to send or receive data thereto or therefrom. To this end, a near-field communication module of the watch type terminal 100 may be configured to sense (or recognize) the external terminal 200 which is communicable therewith at its surroundings. Or a near-field communication module of the external terminal 200 may be configured to sense (or recognize) the watch type terminal 100 which is communicable therewith at its surroundings. For instance, the watch type terminal 100 and the external terminal 200 may communicate with each other through a blue-tooth communication or a Wi-Fi communication.

Moreover, in a case where the watch type terminal 100 or the external terminal 200 is a device which has been authenticated to communicate with each other, at least part of data processed by the watch type terminal 100 is transmitted to the external terminal 200, or at least part of data processed by the external terminal 200 is transmitted to the watch type terminal 100. For instance, in a case where a call signal or a message is received by the external terminal 200, it is possible to execute a call connection or confirm a message through the watch type terminal 100.

In the present invention, the description will be made assuming that the watch type terminal 100 and the external terminal 200 are located at a near distance so that they maintain a connected state or they are in an immediately connectable state at least.

Figure 2A:
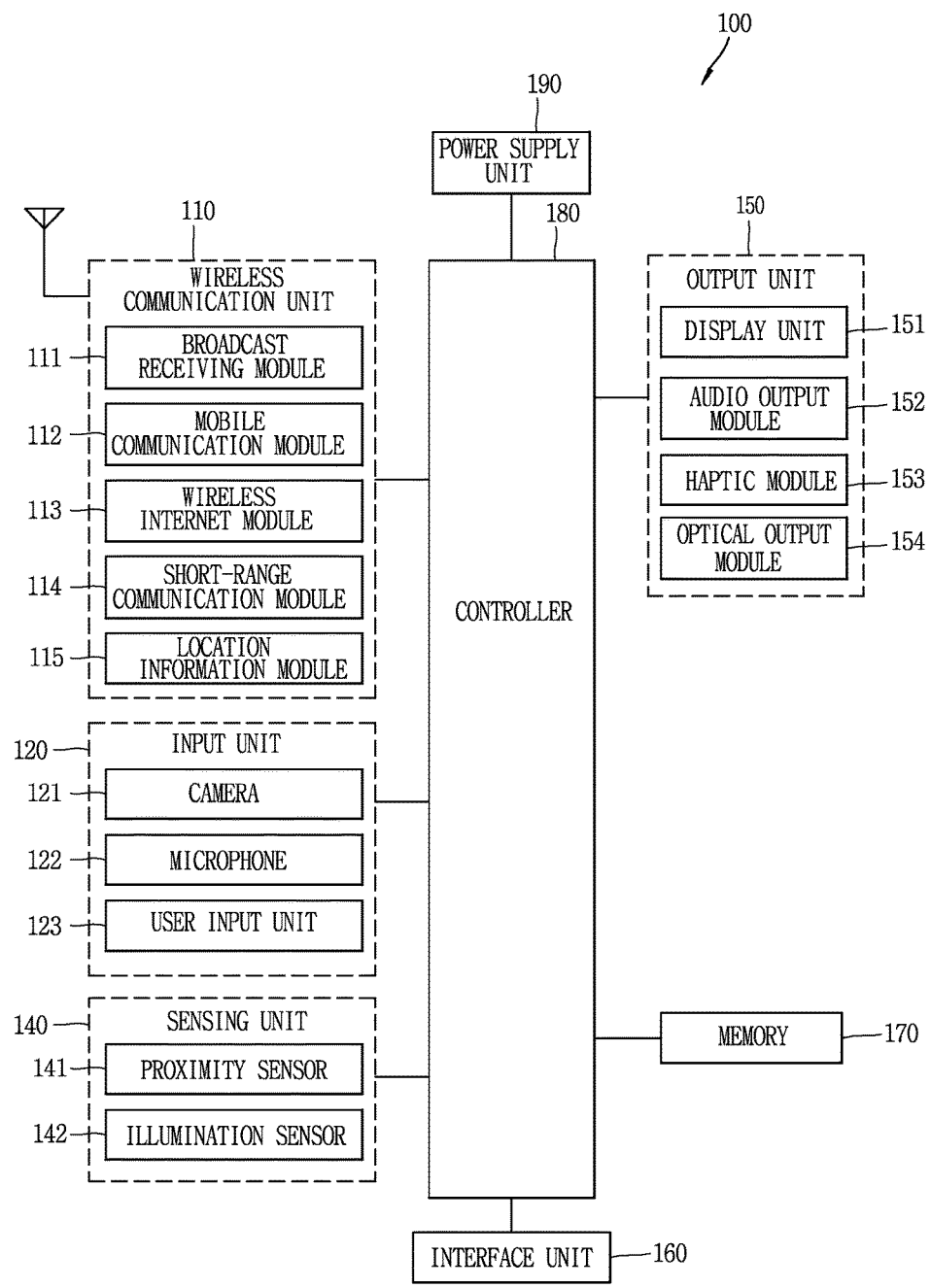
FIG. 2A is a block diagram illustrating a watch type terminal according to the present invention.

FIG. 2A is a block diagram illustrating a watch type terminal 100 according to the present invention, for more specific explanation.

The watch type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the watch type terminal 100 and a wireless communication system, communications between the watch type terminal 100 and another mobile terminal, communications between the watch type terminal 100 and an external server. Further, the wireless communication unit 110 typically includes one or more modules which connect the watch type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch type terminal 100 and a user, as well as function as the user input unit 123 which provides an input interface between the watch type terminal 100 and the user.

The interface unit 160 serves as an interface with various types of external devices that can be coupled to the watch type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch type terminal 100 may perform assorted control functions associated with a connected external device, in response to the external device being connected to the interface unit 160.

The memory 170 is typically implemented to store data to support various functions or features of the watch type terminal 100. For instance, the memory 170 may be configured to store application programs executed in the watch type terminal 100, data or instructions for operations of the watch type terminal 100, and the like. Some of these application programs may be downloaded from an external server via wireless communication. Other application programs may be installed within the watch type terminal 100 at time of manufacturing or shipping, which is typically the case for basic functions of the watch type terminal 100 (for example, receiving a call, placing a call, receiving a message, sending a message, and the like). It is common for application programs to be stored in the memory 170, installed in the watch type terminal 100, and executed by the controller 180 to perform an operation (or function) for the watch type terminal 100.

The controller 180 typically functions to control overall operation of the watch type terminal 100, in addition to the operations associated with the application programs. The controller 180 may provide or process information or functions appropriate for a user by processing signals, data, information and the like, which are input or output by the various components, or activating application programs stored in the memory 170.

As one example, the controller 180 controls some or all of the components so as to drive application programs that have been stored in the memory 170. For driving of the application programs, the controller 180 may operate at least two of the components included in the watch type terminal 100, through a combination.

The power supply unit 190 can be configured to receive external power or provide internal power in order to supply appropriate power required for operating elements and components included in the watch type terminal 100. The power supply unit 190 includes a battery, and the battery is configured to be built-in (mountable) or chargeable.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the watch type terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch type terminal 100 and a wireless communication system, communications between the watch type terminal 100 and another watch type terminal 100, or communications between the mobile terminal and a network where another watch type terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the watch type terminal 100. As another example, the cameras 121 may be located in a stereoscopic arrangement to acquire left and right images for implementing a stereoscopic image.

The microphone 122 is generally implemented to permit audio input to the watch type terminal 100. The audio input can be processed in various manners according to a function being executed in the watch type terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the watch type terminal 100. The user input unit 123 may include one or more of a mechanical input element (for example, a key, a button located on a front and/or rear surface or a side surface of the watch type terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the watch type terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the watch type terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the watch type terminal 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. On the other hand, if the display unit 151 is in a deactivated state (hereinafter, will be referred to as a doze mode), the touch sensor may be activated at preset periods.

When the preset activation period of the touch sensor is shorter, a sensing speed with respect to taps applied onto the display unit 151 is higher. However, in this case, a power consumption amount of the touch sensor may be increased. On the other hand, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'TOCK-TOCK' touch input) is sensed by the touch sensor, the controller 180 may convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch type terminal 100. For example, the display unit 151 may display execution screen information of an application program executing at the watch type terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the watch type terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the watch type terminal 100.

An optical output module 154 can output a signal for indicating an event generation using light of a light source. Examples of events generated in the watch type terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the watch type terminal 100. For example, the interface unit 160 can receive data transmitted from an external device, receive power to transfer to elements and components within the watch type terminal 100, or transmit internal data of the watch type terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the watch type terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the watch type terminal 100 is connected with an external cradle, the interface unit 160 can serve as a passage to allow power from the cradle to be supplied to the watch type terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch type terminal 100 may also be operated in relation to a network storage device that performs the storage function of the memory 170 over a network, such as the Internet.

Especially, the memory 170 may store various set information to operate a 'clipboard function' according to the present invention. The set information may include information on a method to create content information to be stored in a clipboard and a download method of multimedia data. Further, the memory 170 may store an object included in a selected copy region and information of an application (example, a name of an application, information of a recently executed screen, and content stored in an application such as an image and a file) corresponding to the object, and may further store preview screen information corresponding thereto. The information which is stored as execution of 'the clipboard function' may be continuously stored until a user intentionally deletes, or may be stored during a time set through a user's input.

The controller 180 may typically control the general operations of the watch type terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

Further, the controller 180 may control the entire operation related to the above-mentioned 'clipboard function'. For instance, the controller 180 may store content information (content and information of an application corresponding to the content) corresponding to an object included in a copy region selected by the main body or the external terminal, or call pre-stored content information and paste the pre-stored content information to the external terminal.

The power supply unit 190 receives external power or provide internal power and supply the appropriate power required for operating respective elements and components included in the watch type terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

An accessory for protecting an appearance or assisting or extending the functions of the watch type terminal 100 can also be provided on the watch type terminal 100. As one example of an accessory, a cover or pouch for covering or accommodating at least one surface of the watch type terminal 100 may be provided. The cover or pouch may cooperate with the display unit 151 to extend the function of the watch type terminal 100. Another example of the accessory is a touch pen for assisting or extending a touch input to a touch screen.

Figure 2B:
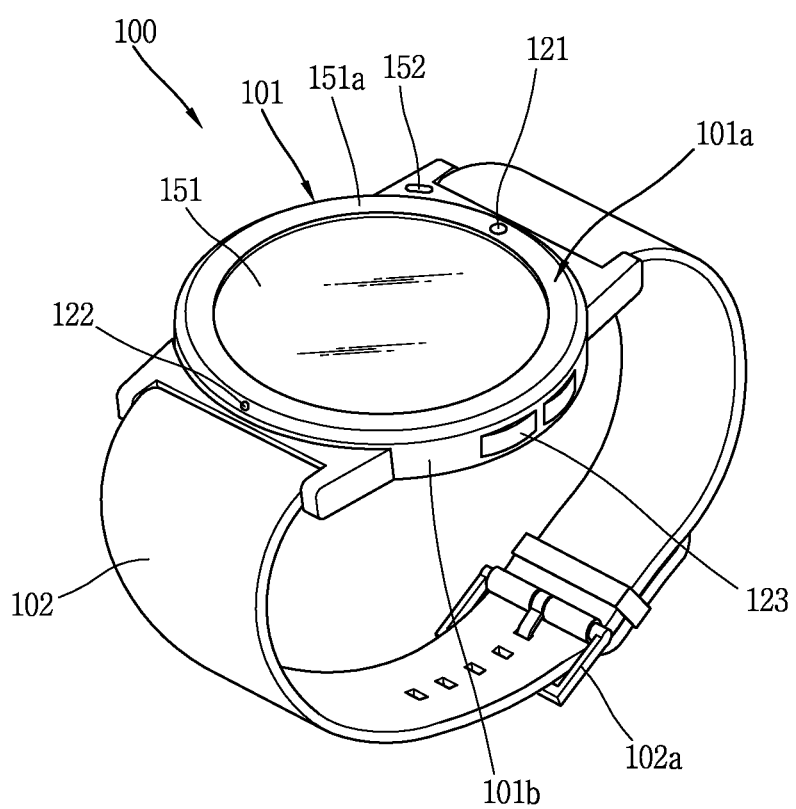
FIG. 2B is a perspective view illustrating an example of the watch type terminal according to the present invention.

FIG. 2B is a perspective view illustrating one example of a watch type terminal 100 in accordance with another exemplary embodiment. As illustrated in FIG. 2B, the watch type terminal 100 includes a main body 101 with a display unit 151 and a band 102 connected to the main body 101 to be wearable on a wrist. In general, the watch type terminal 100 may be configured to include features that are the same or similar to that of the watch type terminal 100 of FIG. 2A.

The main body 101 may include a case having a certain appearance. As illustrated, the case may include a first case 101a and a second case 101b cooperatively defining an inner space for accommodating various electronic components. Other configurations are possible. For instance, a single case may alternatively be implemented, with such a case being configured to define the inner space, thereby implementing a watch type terminal 100 with a uni-body.

The watch type terminal 100 can perform wireless communication, and an antenna for the wireless communication can be installed in the main body 101. The antenna may extend its function using the case. For example, a case including a conductive material may be electrically connected to the antenna to extend a ground area or a radiation area.

The display unit 151 is shown located at the front side of the main body 101 so that displayed information is viewable to a user. In some embodiments, the display unit 151 includes a touch sensor so that the display unit can function as a touch screen. As illustrated, window 151a is positioned on the first case 101a to form a front surface of the terminal body together with the first case 101a.

The illustrated embodiment includes an audio output module 152, a camera 121, a microphone 122, and a user input unit 123 positioned on the main body 101. When the display unit 151 is implemented as a touch screen, additional function keys may be minimized or eliminated. For example, when the touch screen is implemented, the user input unit 123 may be omitted.

The band 102 is commonly worn on the user's wrist and may be made of a flexible material for facilitating wearing of the device. As one example, the band 102 may be made of fur, rubber, silicon, synthetic resin, or the like. The band 102 may also be configured to be detachable from the main body 101. Accordingly, the band 102 may be replaceable with various types of bands according to a user's preference.

In one configuration, the band 102 may be used for extending the performance of the antenna. For example, the band may include therein a ground extending portion (not shown) electrically connected to the antenna to extend a ground area.

The band 102 may include fastener 102a. The fastener 102a may be implemented into a buckle type, a snap-fit hook structure, a Velcro® type, or the like, and include a flexible section or material. The drawing illustrates an example that the fastener 102a is implemented using a buckle.

As described above, the watch type terminal 100 according to an embodiment of the present invention may inform the external terminal 200 that content information corresponding to a selected copy region can be taken to be stored in the watch type terminal 100 when a first input is applied to the display unit 151 of the watch type terminal 100, while a touched state of the selected copy region is maintained at the external terminal 200 using a touch gesture, or while the copy region is selected and an ON state of a screen of the external terminal 200 is maintained within a reference time (for instance, within several seconds).

Here, content information corresponding to the selected copy region may include content included in the selected copy region and information of an application corresponding to such content. And content included in the copy region may include a combination of multimedia content such as a text, an image, sound, and a video, and an icon of an application.

Thereafter, when a second input is applied to the display unit 151, the controller 180 may take content information related to content included in the selected copy region from the external terminal 200, and store the content information to be mapped with a display region corresponding to a current time. To this end, the display unit 151 may be configured to include virtual regions corresponding to each time. And an icon informing that content information has been stored is displayed on the display region corresponding to the current time.

According to this, it is possible to store content information corresponding to the copy region selected by the external terminal through a single touch input or consecutive touch inputs, in the watch type terminal. Further, since it is possible to visually distinguish a time that the content information has been stored from a time that the content information has not been stored, a user may know when the content information was stored in an intuition manner.

Hereinafter, referring to FIGS. 3 and 4, will be described in detail a method to execute a clipboard function with respect to an external terminal using a watch type terminal according to an embodiment of the present invention.

Figure 3D:
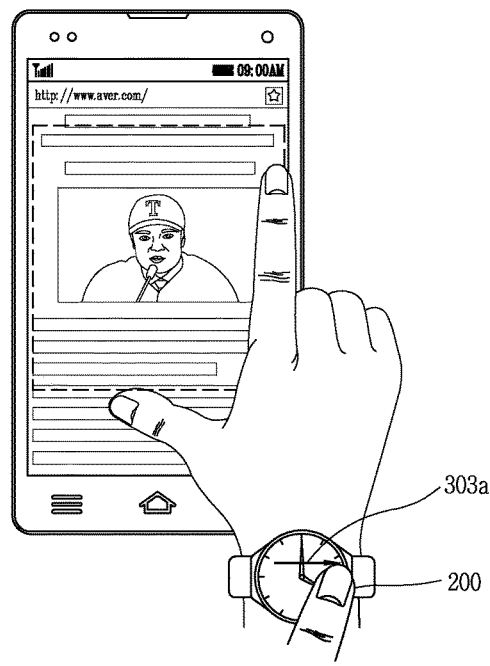
Figure 3E:
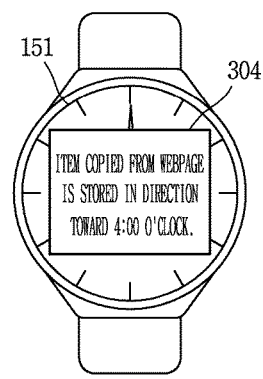
Figure 3F:
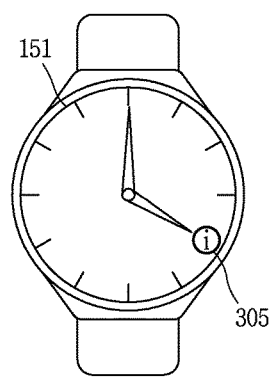
Figure 5A:
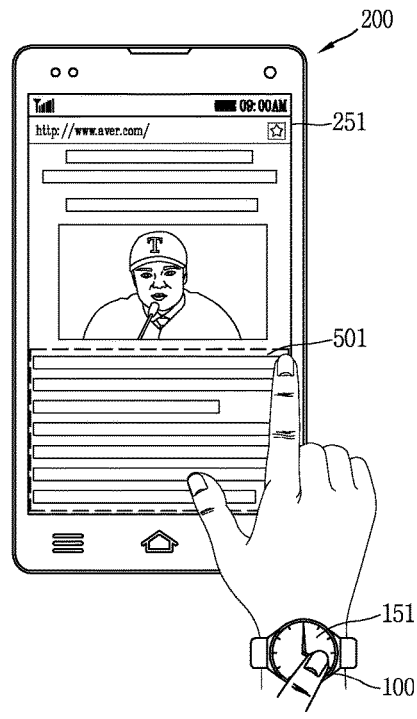
FIGS. 5(a) to 5(d) are schematic views illustrating a method to change content information to be copied using a touch input applied to an external terminal, in a watch type terminal according to the present invention.
Figure 5B:
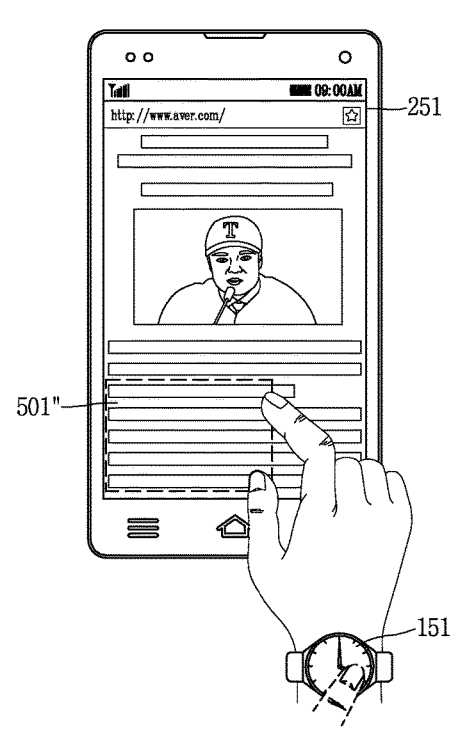
Figure 5D:
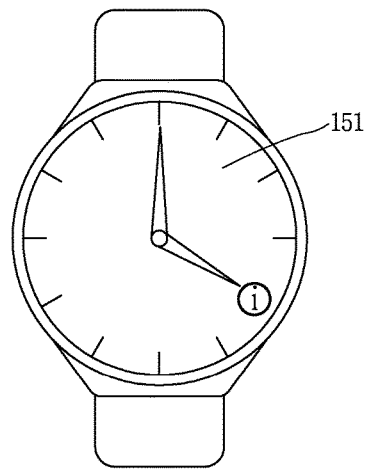
Figure 5C:
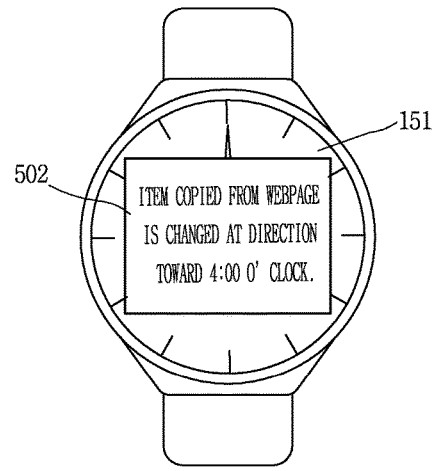
Figure 6A:
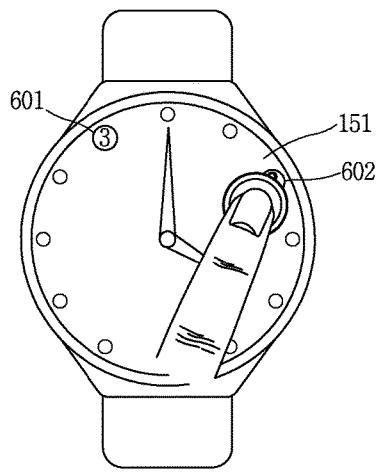
FIGS. 6(a) to 6(d) are schematic views illustrating a method to change a storage space of content information using a touch input applied to the display unit, in a watch type terminal according to the present invention.
Figure 6B:
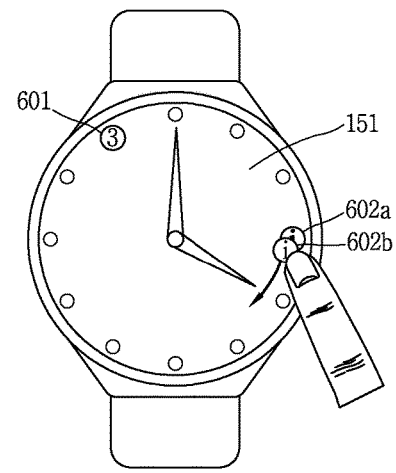
Figure 6D:
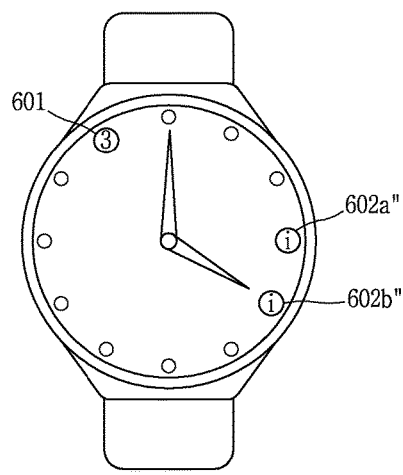
Figure 6C:

FIGS. 3(*a*) to 3(*f*) are representative schematic views illustrating a method to copy and store at least part of screen information which is output from an external terminal by a watch type terminal according to the present invention.

The watch type terminal 100 supports a clipboard function to copy and paste predetermined data. In the present invention, an operation to copy or cut part of a screen which is output from the external terminal 200 may be referred to as 'clip'. In a case where such an operation is executed in cooperation with the watch type terminal 100, it may be referred to as 'clip to the watch type terminal 100'. Further, an operation to attach at least part of content information stored in the watch type terminal 100 to a display of an external terminal (or a plurality of external terminals) may be referred to as 'paste'.

Further, in the present invention, it is exemplary described that a 'clipboard function' between an external terminal and a watch type terminal is executed using a touch-based input. However, the present invention is not limited thereto. For instance, the clipboard function may be executed using a hover-based input.

Specifically, when a reference time (for instance, 2~3 seconds) has elapsed in a state where a user's body like a hand is spaced from the display unit 151 by a predetermined gap (for instance, 5~10 mm) without any tactile contact to the display unit 151, an electric field is generated and transmitted to a touch panel of the display unit 151, so that it is recognized that a hover-based input has been executed.

As shown in FIG. 3(*a*), a user wearing the watch type terminal 100 may select a predetermined portion of a web page screen desired to be copied as a copy region 301 using a two-finger touch gesture (or a three-finger touch gesture) in a state where the webpage screen is being output from a display unit 251 of the external terminal 200. More specifically, when two fingers move in a direction to become distant from each other, a size of the copy region is increased in proportion to a moving distance. On the contrary, when the two fingers move in a direction to become close to each other, a size of the copy region is decreased in proportion to a moving distance.

At the periphery of the selected copy region 301, a box type image (for instance, a dotted line box image) is output so that the selected region may be visually recognized. Further, not only text data, but a combination of multimedia data such as an image, sound, and a video may be included in the copy region 301.

In a selected state of the copy region 301, when a reference time has elapsed with the fingers used to select the copy region 301 fixed, a list 302 of electronic devices which can receive data included in the copy region 301 is overlapped with the copy region 301, as shown in FIG. 3(*b*). In this case, the user's two-finger touch gesture is maintained.

When a user applies a touch input (for instance, a single touch, a long press, and the like) to the display unit 151 of the watch type terminal 100 while the list 302 is output and aforementioned multi-touch-based touch gesture is maintained, as shown in FIG. 3(*c*), the controller 180 informs the external terminal 200 that the data included in the copy region 301 can be stored in the watch type terminal 100, and thus the popup list 302 disappears.

As shown in FIG. 3(*d*), when other consecutive touch input (for instance, a flicking touch input, or a swipe touch input) 303*a* is continuously applied to the display unit 151 in a state that the user does not release the touch input (for instance, a single touch, a long press, and the like), or another touch input is applied within a reference time after releasing the touch input (for instance, a single touch, a long press, and the like), data included in the copy region 301 is transmitted to the watch type terminal 100. That is, data included in the selected copy region 301 is clipped to the watch type terminal 100. While data included in the selected copy region 301 is transmitted, an icon indicating that data is being transmitted may be output to the external terminal 200 and the watch type terminal 100.

In this case, the controller 180 is configured to store data included in the selected copy region 301 to be mapped with a region corresponding to a current time of the watch type terminal 100. Here, the region corresponding to the current time is indicative of a display region positioned on the display unit 151 of the watch type terminal 100 in a direction indicating a current time. And storing data to be mapped in a region corresponding to the current time means storing data such that the stored data may be called, edited, moved, or controlled by applying an input to the display region positioned in a direction indicating the current time.

For instance, as shown in FIG. 3(*e*), when data transmission is completed, a popup message window 304, indicating that the transmitted data has been stored, is displayed on the display unit 151 of the watch type terminal 100. The message window 304 may include, as shown in the drawings, information on a region where data has been stored (for instance, in a direction toward four o'clock).

On the region corresponding to the current time (for instance, four o'clock), an icon 305 indicating that data has been stored is displayed. For instance, an original image object indicated as 'i' is displayed on a region in a direction toward four o'clock, as shown in FIG. 3(*f*). Thus, it is possible to immediately notice existence of data clipped at about four o'clock through the icon 305. Also, it is possible to visually distinguish a region where the clipped data is stored from a region where the clipped data is not stored through the icon 305. The controller 180 may be configured to call, edit, move, or control the stored data by sensing an input applied to the icon 305.

Hereinafter, referring to FIG. 4, will be described in detail a method to copy and store at least part of screen information which is output from the external terminal 200 by the watch type terminal 100 according to the present invention.

As shown in FIG. 4, the watch type terminal 100 may be configured to sense that a first touch input is received on the display unit 151 while selection of a copy region is maintained at the external terminal 200 (S410).

Here, the selection of the copy region may be executed through an input of a two-finger touch gesture or a three-finger touch gesture to the display unit 251 of the external terminal 200. For instance, it is possible to select a copy region by applying a two-finger touch gesture or a three-finger gesture so that one or more objects desired to be copied or cut can be included in a state where screen information (for instance, an execution screen of an application such as a home screen page and a webpage) is output to the display unit 251 of the external terminal 200.

Further, the controller 180 may sense the first touch input under a condition that the touch gesture with respect to the external terminal 200 is effectively maintained.

Specifically, when a user applies a touch gesture (for instance, a two-finger or a three-finger touch gesture) for selecting a copy region to the display unit 251 of the external terminal 200, the external terminal 200 transmits a signal which informs that generation of the copy region and preparation for transmission of content included in the copy region are completed, to devices connected to the external terminal 200.

In this case, the external terminal 200 may transmit a valid time of the generated copy region to the devices which are connected thereto, and execute preparation for transmission of content included in the copy region to one or more devices which sent an accept signal when the accept signal is received by the external terminal 200 from the one or more devices within the valid time. Here, the valid time means a time that the touch gesture for selecting a copy region is maintained, and may be informed to a user by outputting a graphic object (or LED, sound, vibration, or the like) informing that the touch gesture for selecting the copy region is maintained or a graphic object (or LED, sound, vibration, or the like) informing that the touch gesture is released.

For instance, when a first touch input is applied to the display unit 151 of the watch type terminal 100 within a valid time in a state where a user maintains a touch gesture using one hand for selecting a copy region on the display unit 251 of the external terminal 200, an accept signal is transmitted to the external terminal 200 and the watch type terminal 100 prepares to take content included in the selected copy region.

The controller 180 may recognize that a first touch input (for instance, a single touch, a long press, and the like) has been applied, if a user applies a touch to the display unit 151 of the watch type terminal 100 using another hand while maintaining a touch gesture using one hand selecting a copy region on the display unit 251 of the external terminal 200. Here, the first touch input may correspond to generation of a touch-down event at one spot of the display unit 151.

When the first touch input is sensed, the controller 180 informs the external terminal 200 that the watch type terminal 100 is in a state to be able to store content information corresponding to the copy region, through the wireless communication unit 110 (S420).

Here, the content information corresponding to the copy region may include both content included in the copy region and information of an application corresponding to the content.

Further, the content included in the copy region may include a combination of multimedia content such as an object, a text, an image, sound, and a video, etc. Further, the information of an application corresponding to content may include a title of an application, information of a recently executed screen, and all types of content stored in an application such as images and files, set information of content (for instance, content metadata such as a font and alignment), a currently executed menu or state of an application size, and a currently executed operation, version information of an application, and information additionally stored for execution of an application.

That is, a state that the watch type terminal 100 is able to store content information corresponding to the selected copy region means a state that data combined with multimedia content such as an object, a text, an image, sound, and video included in the copy region, metadata related to the data, a title of an application corresponding to the content, recently executed screen information, stored content, and metadata related to a recently-executed task can be stored.

When such state is informed to the external terminal 200, the external terminal 200 may generate a trigger signal for transmission of content information corresponding to the selected copy region. Further, the controller 180 may output screen information which informs that content information corresponding to the selected copy region from the external terminal 200 can be taken, to the display unit 151.

Under such state, the controller 180 may sense that a second touch input is received on the display unit 151 of the watch type terminal 100 (S430).

Here, the second touch input may be other touch inputs (for instance, a flicking touch input, a swipe input, or a predetermined touch pattern) which are consecutively sensed in a state where the first touch input is not released. Otherwise, the second touch input may be touch inputs (for instance, a single touch, a long press, a flicking touch input, a swipe touch input, a predetermined pattern, or the like) which are consecutively applied within a predetermined time after the first touch input is released.

When the second touch input is sensed, the controller 180 transmits a control command such that the external terminal 200 may transmit content information corresponding to the copy region. The external terminal 200 initiates transmission of content information corresponding to the copy region, based on the transmitted control command. The controller 180 may control the wireless unit 110 to receive content information corresponding to the copy region when the second touch input is released.

Further, the controller 180 may output an indicator which informs that information of an application corresponding to the content and the content information will be stored, to the display unit 151 when the second touch input is received. In this case, the indicator may include information which informs a position where the content information will be stored or a display region to be mapped with the region. For instance, the indicator may be outputted in a form of a message such as 'an item copied at a webpage will be stored in a direction toward four o'clock', as shown in FIG. 3 (f).

Meanwhile, it may be set that a touch gesture applied to the external terminal 200 should be maintained while the content information is transmitted. That is, when a touch gesture applied to the external terminal 200 is released, or both a touch gesture applied to the external terminal 200 and a second touch input applied to the watch type terminal 100 are released while the content information is transmitted, data transmission may be interrupted. Alternatively, according to a setting, after a second touch input is generated from the watch type terminal 100, although a touch gesture which has been applied to the external terminal 200 is not maintained, data transmission may be completed.

Next, the controller 180 stores content information received from the external terminal 200 in a display region corresponding to the current time so as to be mapped (S440).

Here, the display region corresponding to the current time is indicative of a display region which is positioned at the display unit 151 of the watch type terminal 100 in a direction indicating the current time.

Specifically, the watch type terminal 100 may have division points at an edge region of the display unit 151 in a direction indicating time, according to its own characteristics of informing time information, for instance, such division points may be implemented as Arabic numerals from 1 to 12 or Roman alphabets displayed at an edge region of the display unit 151, from the right to the left, scale images corresponding to the Arabic numerals or Roman alphabets, or virtual points. Further, in another embodiment, the division points may be more or less than twelve in number. For instance, a first division point is formed based on a user's wearing time point of the watch type terminal 100, and as the wearing time is increased, the division points may be increased while rotating to the right along the edge region of the display unit 151.

Further, storage of received content information in a region corresponding to the current time so as to be mapped, may mean storage of data so that the stored data may be called, edited, moved or controlled by applying an input to a display region positioned in a direction indicating the current time. That is, a user may control stored data by applying an input to a division point corresponding to time when data has been stored, without needing to know a space where the data has been substantially stored.

Next, the controller 180 is configured to output an icon informing that the received data has been stored, to a display region corresponding to the current time (S450).

Here, the icon may be an icon of an application corresponding to content included in the copy region. For instance, in a case where a copy region is selected by executing a gallery application at the external terminal 200, the controller 180 may output an icon of the gallery application to a display region corresponding to the current time.

Alternatively, the icon may be simply an image object (for instance, an image marked with 'i') informing existence of stored content information, or other image object including an indication distinguished from a display region where content information has not been stored.

The icon may be output to a display region which is positioned in a direction toward time when content is stored. Here, the icon may be output in a different image (for instance, different color or shape), or at a different position depending upon time that content is stored, i.e., depending on whether a storage time is before noon or afternoon). For instance, content stored at 9:00 a.m. is output to a display region in a direction toward 9:00 a.m. in a bright color (for instance, yellow) image object (for instance, an image marked with 'I'), and content stored at 10:00 p.m. is output to a display region in a direction toward 10:00 p.m. in a dark color (for instance, gray) image object (for instance, an image marked with 'i'). Further, for instance, content stored at 9:00 a.m. is output at a left side or inner side, and content stored at 9:00 p.m. is output at a right side or outer side based on the direction of nine o'clock (contrast to an icon corresponding to content stored before noon).

Further, the icon may be output between the current time and the next time considering an hour and a minute that content has been stored. For instance, in a case where time that content has been stored is 10:30, the icon may be output between a display region in a direction toward ten o'clock and a display region in a direction toward eleven o'clock.

Meanwhile, since the watch type terminal 100 provides a screen provided with time information as a basic screen, a user may immediately confirm whether any clipped data exists in the watch type terminal 100, or what time the clipped data was stored through the basic screen.

So far, a process to clip data patched from the external terminal 200 to the watch type terminal 100 has been specifically described. In this regard, FIG. 5 shows a process to change content information to be taken to the watch type terminal 100 using a touch gesture applied to the external terminal 200.

Meanwhile, as shown in FIG. 5 (*a*), as an example of the flowchart of FIG. 3, when one spot on the display unit 151 of the watch type terminal 100 is touched (that is, a first input is applied) using a two-finger touch gesture in a state where part of a webpage which is output to the external terminal 200 is selected as a copy region 501, the controller 180 may recognize that content information corresponding to the selected copy region 501 can be taken.

Thereafter, the controller 180 transforms the two-finger touch gesture applied to the display unit 251 of the external terminal 200 in a state where the first touch input applied to the display unit 151 of the watch type terminal 100 is maintained. For instance, when a user drags so that touched spots may be changed while maintaining a gap between the two fingers, content (for instance, an object, a text, an image, sound, a video, and the like) included in the copy region is changed. Further, for instance, when a user drags so that a gap between the two fingers becomes large or small, both a size of the copy region and content included in the copy region are changed.

When a first image object (that is, a dotted line image in an edge form) surrounding the touch region 501 is changed to a second image object by changing two-finger touch spots, the external terminal 200 may recognize a changed touch region 501".

When a touch gesture corresponding to selection of a copy region is changed while the first touch input is maintained at the display unit 151, the controller 180 may recognize that the copy region and content information corresponding to the copy region have been changed.

And the controller 180 stores content information corresponding to a copy region which was finally changed when the second touch input has been received, so as to be mapped at a display region corresponding to the current time.

As a result, as shown in FIG. 5 (*c*), a popup message 502 such as 'an item copied from a webpage has been changed in a direction toward four o'clock' is displayed on the display unit 151. And an icon 503 informing that changed content information has been stored may be displayed on a display unit which is positioned in a direction toward four o'clock.

Meanwhile, though not shown, stored content may be re-changed after the message 502 is popped up on the display unit 151, or after the icon 503 is displayed. For instance, when a copy region is re-selected using a touch gesture applied to the watch type terminal 100 while the same content is displayed on the external terminal 200, and thereafter when a long press input is applied to the icon 503, content information corresponding to the icon 503 is changed to content information corresponding to the re-selected copy region. As the long press input is applied to the icon 503, a message inquiring whether to change stored content information may be popped up on the display unit 151. In this case, content information corresponding to a newly selected copy region is added to pre-stored content information unless the same content is displayed on the external terminal 200.

FIGS. 6(*a*) to 6(*d*) illustrate a process to change a space where content information is stored using a touch input to the display unit 151 in a state where at least one content information is clipped to the watch type terminal 100.

In an embodiment of the present invention, clipped data is stored so as to be mapped with a display region of the display unit 151 corresponding to the current time. Thus, in a case where a plurality of content information are stored at the same time, icons corresponding to the respective content information may be displayed on the same region (or same spot), or may be displayed in a partially overlapped manner.

Alternatively, as shown in FIG. 6 (*a*), only one icon may be displayed and a numeral image indicating the number of content information stored in the corresponding region may be displayed on the icon. For instance, as shown, a first icon 601 indicating that three content information have been stored is displayed at 11:00 o'clock, and a second icon 602 indicating that two content information have been stored is displayed at 2:00 o'clock. In this case, the display is simple, but it is difficult to control stored content information using each icon.

Thus, as shown in FIG. 6 (*b*), when a long press input is applied to the second icon 602, the second icon 602 is converted into a plurality of sub-icons 602*a* and 602*b* which are movable. The plurality of sub-icons 602*a* and 602*b* are unfolded while rotating to the right along an edge region of the display unit 151, and may be images different from the second icon 602. Here, the different image means that at least one of a color, a size, a cubic effect, and displayed information is changed.

When the plurality of sub-icons 602*a* and 602*b* are unfolded, the sub-icon 602*b* desired to move is selected and may be moved to a desired region by applying a drag input rotating along the edge region of the display unit 151 to the sub-icon 602*b*. The controller 180 arranges the sub-icon 602*b* at a region corresponding to a time which is closest to a spot where the drag input is released. Further, as the sub-icon 602*b* is moved, an arrangement which informs that corresponding content information is stored is changed.

When the position of the icon informing storage of content information is changed, a message 603 which informs the change is popped up on the display unit 151, as shown in FIG. 6 (*c*). Further, as shown in FIG. 6 (*d*), the second icon 602 is replaced by an icon 602*a*" of an application corresponding to content information stored at 3:00 o'clock, and an icon 602*b*" of an application corresponding to content information stored at 4:00 o'clock, respectively.

In the above embodiments, has been explained that a copy region is selected by applying a multi-touch gesture to the external terminal 200, and data is taken from the external terminal 200 by applying a single touch to the watch terminal 100.

Meanwhile, unlike the above described embodiments, it may be configured to select a copy region by applying a single touch to the external terminal 200 and to take data from the external terminal 200 by applying a multi-touch gesture to the watch type terminal 100. That is, it is possible to distinguish a device to select a copy object from a device to take data, using different touch patterns.

However, an object to be copied is first selected in any case. Specifically, in order to take data from the external terminal 200 by the watch type terminal 100, it is necessary to input first the aforementioned multi-touch gesture or single touch gesture to the external terminal 200. That is, it is possible to distinguish a device to select an object to be copied from a device to take copied data, by different touch orders.

Figure 7A:
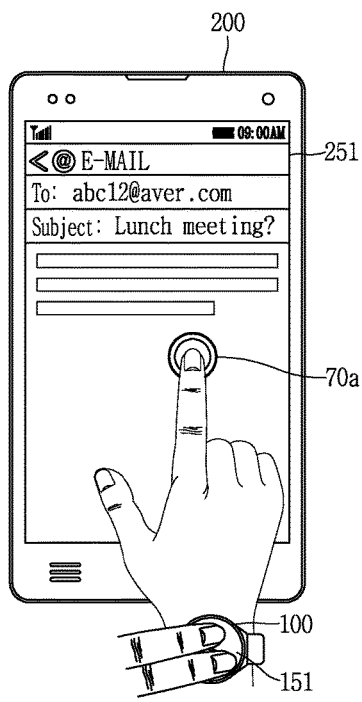
FIGS. 7A(a) to 7A(c), 7B(a) to 7B(d), and 7C(a) to 7C(d) are exemplary schematic views illustrating a method to store other content information according to objects included in a copy region, in a watch type terminal according to the present invention.
Figure 7A:
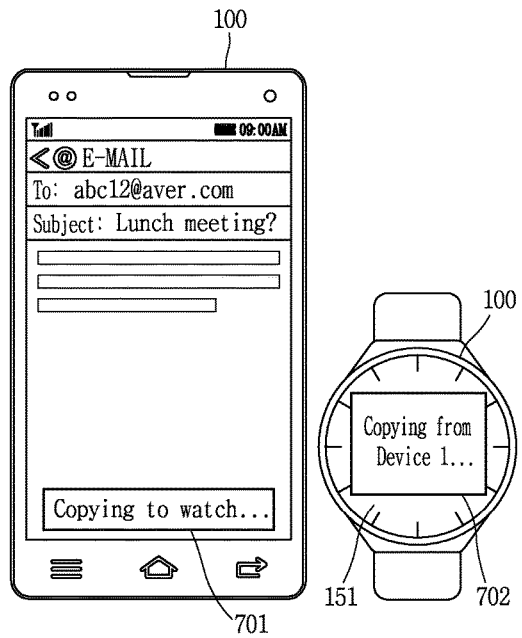
Figure 7A:
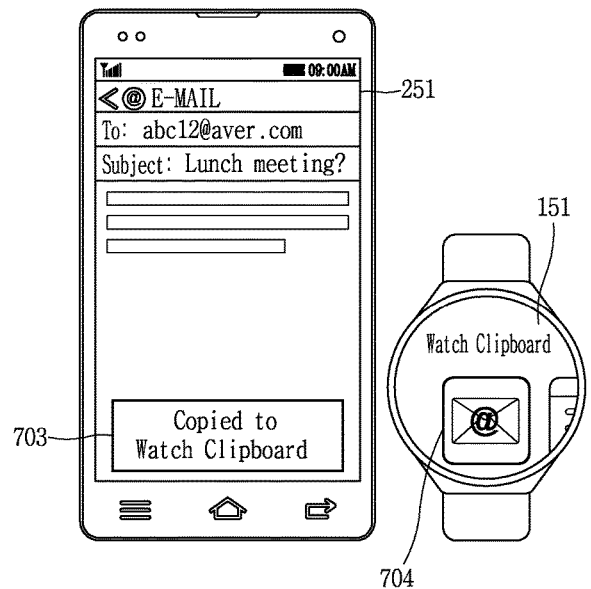

As an example of the flowchart of FIGS. 3, 7A(a) to 7A(c), 7B(a) to 7B(d), and 7C(a) to 7C(d) are views illustrating examples in which different content information is stored according to an object included in a selected copy region in the watch type terminal according to an embodiment of the present invention.

Figure 7B:
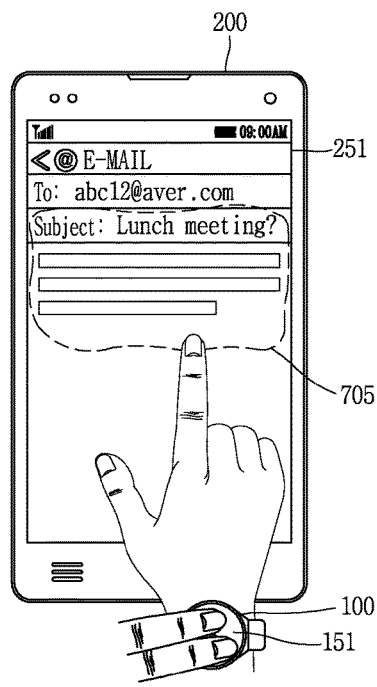
Figure 7B:
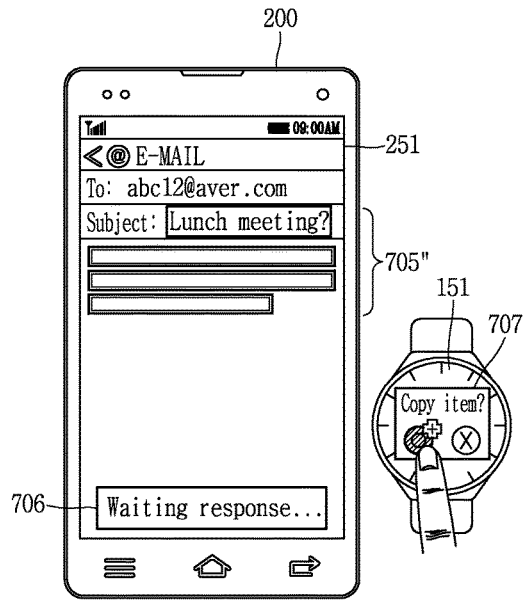
Figure 7B:
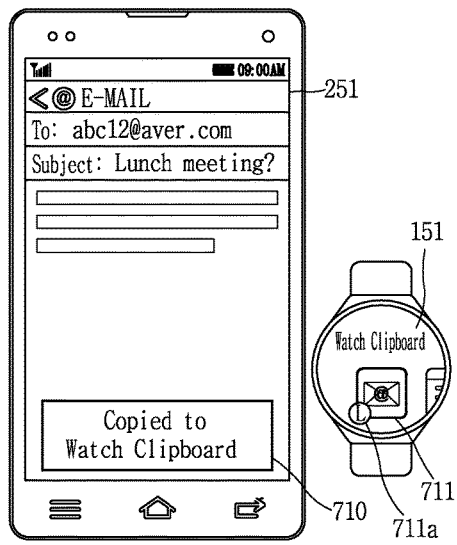
Figure 7B:
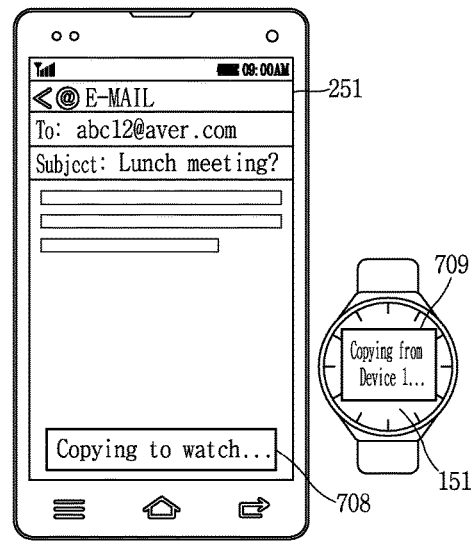
Figure 7C:
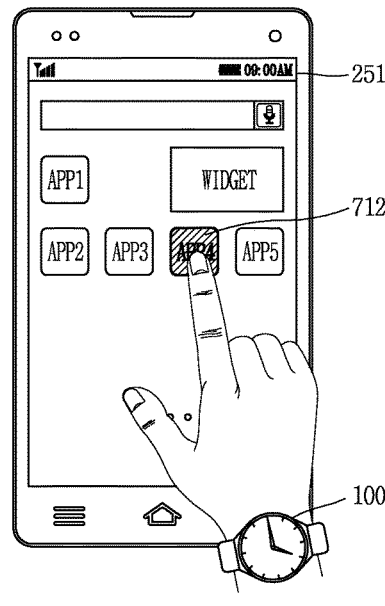
Figure 7C:
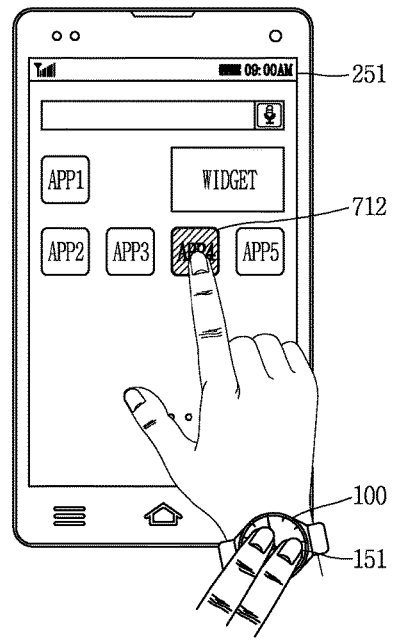
Figure 7C:
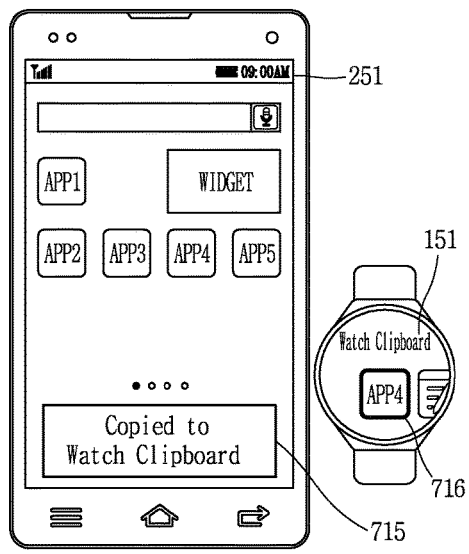
Figure 7C:
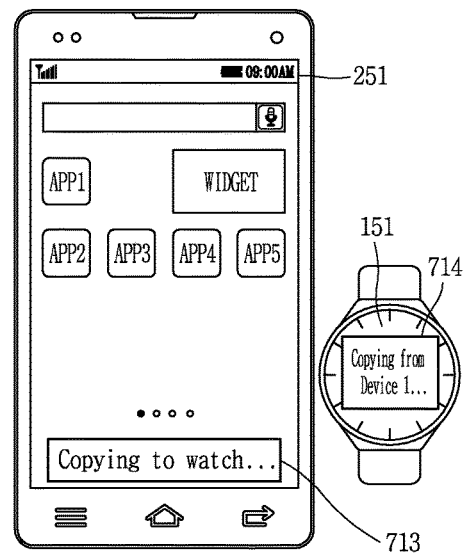

FIGS. 7A(a) to 7A(c) shows a case that an entire execution screen of a specific application is selected as a copy object, FIGS. 7B(a) to 7B(d), shows a case that a partial object included in an execution screen of a specific application is selected as a copy object, and FIGS. 7C(a) to 7C(d) shows a case that an icon of an application installed in the external terminal 200 is selected as a copy object.

In the present invention, only an independent object such as a text or an image included in a copy region is not copied one by one, but multimedia data such as a text, an image, sound, a video, URL, or content included in the copy region may be combined with text data. The combined data may be copied while it maintains the original data format.

Further, according to the present invention, it is possible to store information on an application corresponding to a current copy region, for instance, a title of an application, an execution state of an application (or recent executed screen), content stored in the application (for instance, images, files, memos, and the like), temporary data being drafted (for instance, an address and a title of an e-mail being drafted, and the like), in the memory 160 in a metadata format.

Referring to FIG. 7A (a), when a user applies a two-finger tap to the display unit 151 of the watch type terminal 100 with another hand, in a state where an execution screen of an e-mail application has been output to the display unit 251 of the external terminal 200 and the user has applied a single touch 70*a* to one spot on the display unit 251, not only temporary data (for instance, an address of an e-mail recipient, a title of the e-mail, content of the e-mail, and the like) which is being drafted at the e-mail application, but information on the corresponding application is transferred to the watch type terminal 100.

During the transmission of the information, indicators 701 and 702 which inform that data is being transmitted may be output to the external terminal 200 and the watch type terminal 100, as shown in FIG. 7A (b). Here, it may be set that at least the single touch 70*a* applied to the external terminal 200 should be continuously maintained during the data transmission. According to a setting, the data transmission may be effectively executed although the single touch 70*a* applied to the external terminal 200 is released.

When the data transmission is completed, an icon 703 informing that data has been copied to the watch type terminal 100 is output to the external terminal 200, and an icon of an e-mail application is output to the display unit 151 of the watch type terminal 100. In this case, the received data is stored so as to be mapped with a region corresponding to the current time, as described above.

Next, referring to FIGS. 7B(a) to 7B(d), a user may select a partial object by drawing a touch track in the form of a closed curve on an execution screen of an e-mail application of the external terminal 200. To distinguish this from a usual copy region, it may be defined as a closed curve (or lasso) region. Here, the selectable partial object is an object which can be copied, which may include an image, sound, a file, a text, and the like, for instance.

As shown in FIG. 7 B (a), when a two-finger tap is applied to the display unit 151 of the watch type terminal 100 in a state where a title and content of an e-mail are continuously selected as the lasso region (705), texts included in the lasso region are displayed as a block (705"). Meanwhile, in a case where images are included in the lasso region, an indication such as 'x' or 'v' may be output to a check box which is displayed close to each of the images.

And a message (707) inquiring as to whether to copy data displayed in a block is popped up on the display unit 151 of the watch type terminal 100. If an indication, 'O' is selected, transmission of the data which is displayed on a block is initiated, and indicators 708 and 709 informing that the data is being transmitted, may be output to the external terminal 200 and the watch type terminal 100, as shown in FIG. 7B (c). In this case, since the selected lasso region is continuously displayed on a block, it is not necessary to maintain the touch applied to the external terminal 200 during the data transmission.

When the data transmission is completed, an icon 710 informing that data has been copied to the watch type terminal 100 is output to the display unit 251 of the external terminal 200, and an icon 711 of an e-mail application is output to the display unit 151 of the watch type terminal 100. Here, a specific indication (for instance, 'L') (711a) which informs that only part of information is stored may be displayed at a position close to the icon 711.

Next, as shown in FIG. 7C (a), when a two-finger tap is applied to the display unit 151 of the watch type terminal 100 within a reference time in a state where a home screen page is output to the display unit 251 of the external terminal 200 and a single touch input is applied to an icon 712 of a specific application, data transmission is initiated, as shown in FIG. 7C (c).

Here, the controller 180 of the watch type terminal 100 controls the wireless communication unit 110 to receive content stored in an application corresponding to the selected icon 712 together with metadata of content which has been recently executed from the application.

Specifically, information on an application, for instance, data [such as a title of an application, a state of execution of an application (or a recent execution screen), content stored in an application (for instance, an image, a file, a memo, and the like), a temporary data being drafted (for instance, an address and a title of an e-mail being drafted)], is received to be stored in a metadata format. As a result, not only information stored in an application which has been installed in the external terminal 200, but also a recent executed state are copied to the watch type terminal 100, which is entirely different from installation of the same application in the watch type terminal 100.

When the data transmission is completed, an icon 715 informing that data has been copied to the watch type terminal 100 is output to the display unit 251 of the external terminal 200, and an icon 716 of the same application is displayed on the display unit 151 of the watch type terminal 100.

So far, various embodiments of the present invention have been described, where content information corresponding to a selected copy region is clipped to the watch type terminal using a touch gesture applied to the external terminal. Hereinafter, will be described specifically various embodiments in which data clipped to the watch type terminal is pasted to the external terminal or to other devices.

Here, like in the aforementioned embodiments, an operation to clip content information corresponding to a copy region selected from the external terminal 200 to the watch type terminal 100, is defined as a 'clip event'. Further, as described below in more detail, an operation to paste data clipped to the watch type terminal 100 to other devices, is defined as a 'paste event'.

The controller 180 of the watch type terminal 100 may distinguish the clip event from the paste event by order of applying a touch gesture to the external terminal 200 and a touch input to the display unit 151 of the watch type terminal 100.

Specifically, the controller 180 may recognize that a paste event has occurred when a two-finger tap is applied to the watch type terminal 100 in a state where a single touch is maintained after the single touch is applied to the external terminal 200. As another example, the controller 180 may recognize that a paste event has occurred when a single touch is applied to the external terminal 200 after a two-finger tap is first applied to the watch type terminal 100.

Further, the controller 180 of the watch type terminal 100 may distinguish the clip event from the paste event according to a type of a touch pattern sensed by the display unit 151. Specifically, the controller 180 may recognize that a clip event has occurred when a touch applied to the display unit 151 is a short press and/or a swipe touch input which is pushed to a region indicating a time (that is, an edge region of the display unit 151).

Further, for instance, the controller 180 may recognize that a paste event has occurred when a touch applied to the display unit 151 is a long press and/or a swipe touch input which is pulled out from a region indicating a time (that is, an edge region of the display unit 151).

Hereinafter, will be described in detail a method to paste content information stored in (or clipped to) the watch type terminal 100 to the external terminal 200, using a touch input to the display unit of the watch type terminal, that is, an operation of the watch type terminal 100 related to a paste event, with reference to FIGS. 8A(a) to 8A(d) and 8B(a) to 8B(d).

First, an icon, which visually shows a display region (an edge region of the display unit 151) informing that time information indicated by an hour hand and a minute hand and clipped data has been stored, is displayed on the display unit 151 of the watch type terminal 100 (refer to FIG. 3 (e)). Thereafter, when a long press input is applied to the display unit 151 of the watch type terminal 100, a connection to a peripheral external terminal is attempted, as shown in FIG. 8A (a).

Figure 8A:
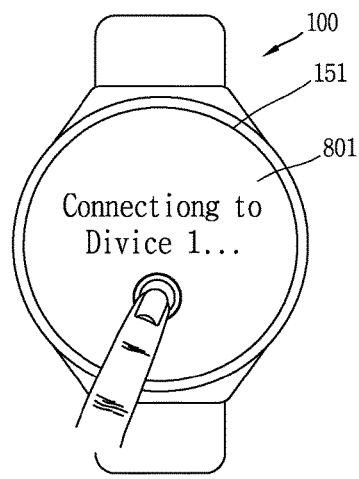
FIGS. 8A(a) to 8A(d) and 8B(a) to 8B(d) are exemplary schematic views illustrating a method to paste stored content information to an external terminal using a touch input applied to a display unit, in a watch type terminal according to the present invention.
Figure 8A:
Figure 8A:
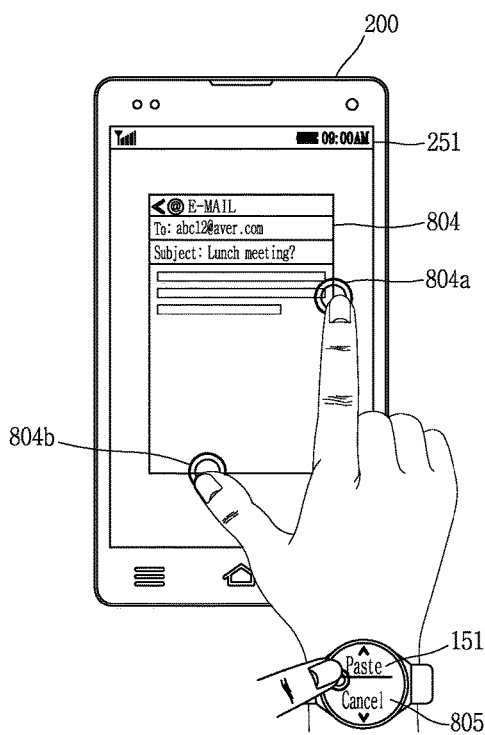
Figure 8A:
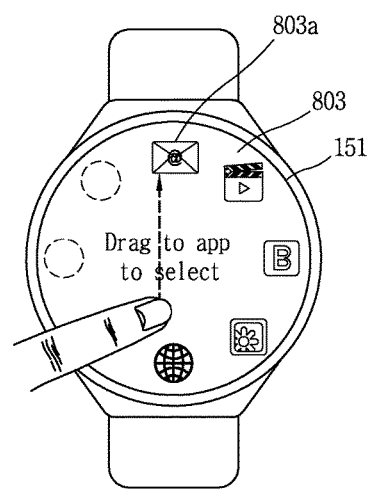

When a reference time has elapsed (for instance, 2~3 seconds) in a state where the long press input is maintained, a connection screen 801 which is output to the display unit 151 is converted into a selection screen 803 to select clipped data, as shown in FIG. 8A (c). Icons of the data clipped to the watch type terminal 100 are output to the selection screen 803 along an edge region of the display unit 151. In this case, in some instances, icons of the clipped data may be output while rotating in one direction on the display unit 151. Icons of applications corresponding to the clipped data are displayed in a transmittable format. Here, the transmittable format means a state that when a touch is applied to the displayed icon of the application, corresponding data can be transmitted to a connected external terminal.

When the first long press touch input is maintained for more than a reference time and a drag input toward an icon of a specific application (for instance, an icon of an e-mail application) (803a) is applied, content information to be transmitted is selected. When a two-finger touch gesture (804a and 804b) is applied in a state where the drag input is maintained, as shown in FIG. 8A (d), a preview screen 804 corresponding to the selected content information is displayed. And a menu 805 to execute a paste operation is displayed on the watch type terminal 100.

Meanwhile, in another embodiment, in a case where the first long press touch input is released within a reference time after the watch type terminal is automatically connected to an external terminal, as shown in FIG. 8A (a), the connection screen 801 which is output to the display unit 151 is converted into a copy & paste screen 802 where clipped data is stored, as shown in FIG. 8A (b). In this state, when a touch input to select a content information item, 'paste' transmitted from the external terminal 200 (e.g. "paste") is applied to the copy & paste screen 802, the screen 802 is changed to the screen 803 of FIG. 8A (c). Alternatively, in a state where the copy & paste screen 802 is output, as shown in FIG. 8A (b), the screen 802 may be converted into the screen 803 of FIG. 8A (c) after a touch gesture is applied to the external terminal 200 as shown in FIG. 8A (d).

In another embodiment, when a touch input to select "copy" (for instance, a touch input to the left icon) is applied onto the copy & paste screen 802 and a "copy" region or a copy object is selected from the external terminal 200, content information included in the selected copy region or copy object is copied to the watch type terminal 100.

In a further embodiment, when a touch input-based region is selected from the external terminal 200 in a state where a content item ("paste") is selected from the copy & paste screen 802, or "copy" is not selected (i.e. without applying a touch input), a paste function is executed with respect to the selected region.

Figure 8B:
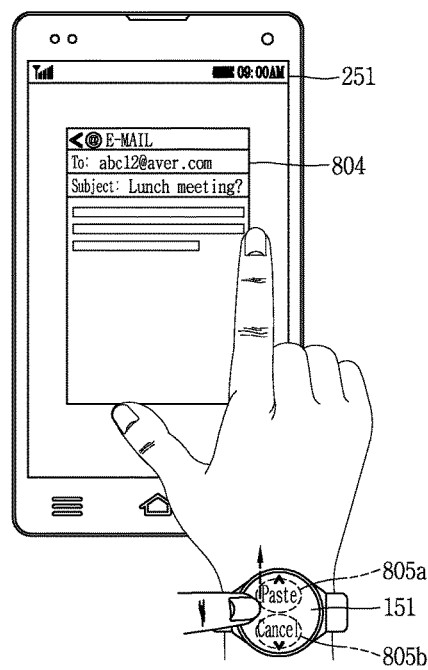
Figure 8B:
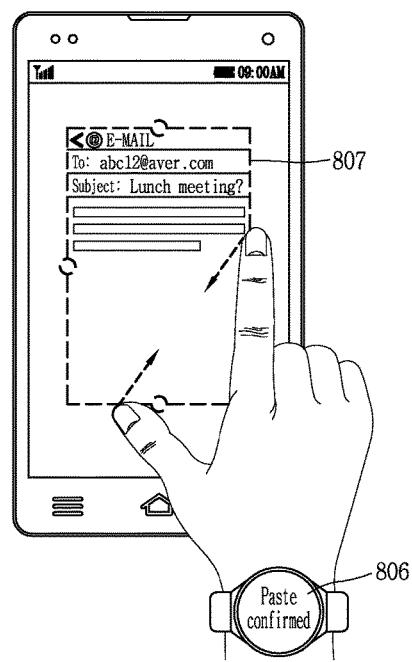
Figure 8B:
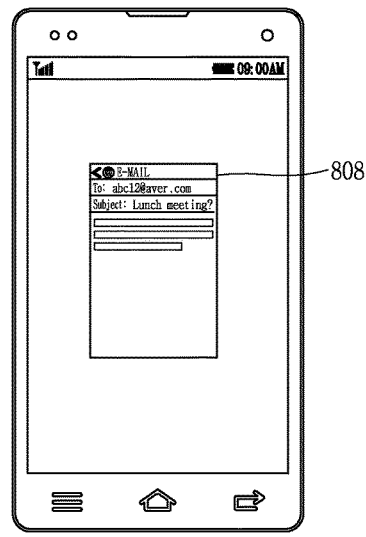
Figure 8B:
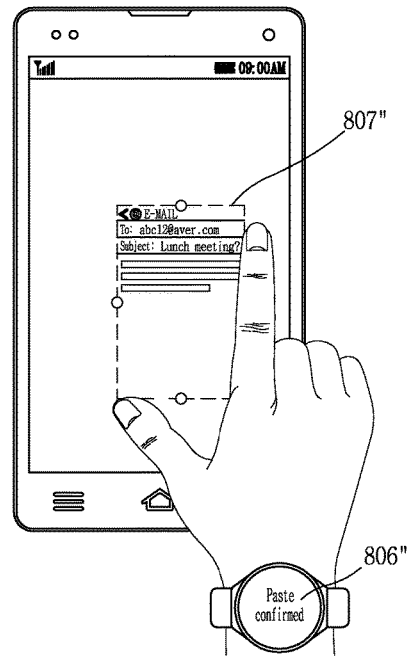
Figure 9A:
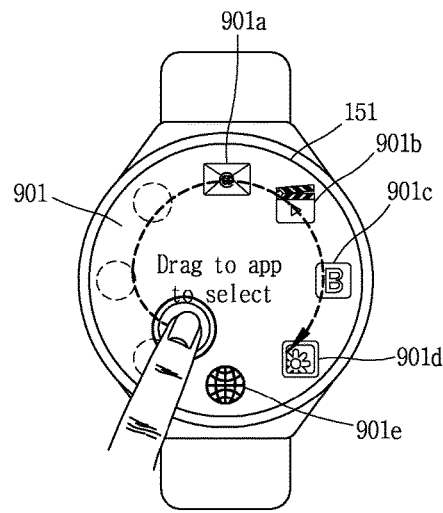
FIGS. 9(a) to 9(d) are exemplary schematic views illustrating a method to multi-select and paste stored content information to the external terminal, in a watch type terminal according to the present invention.
Figure 9B:
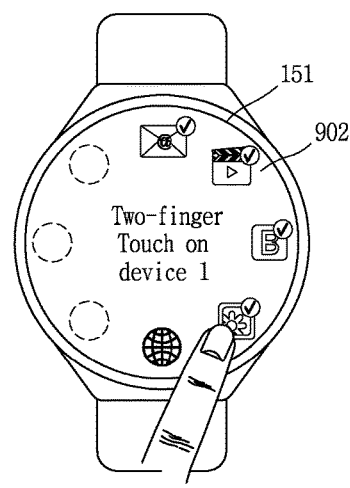
Figure 9D:
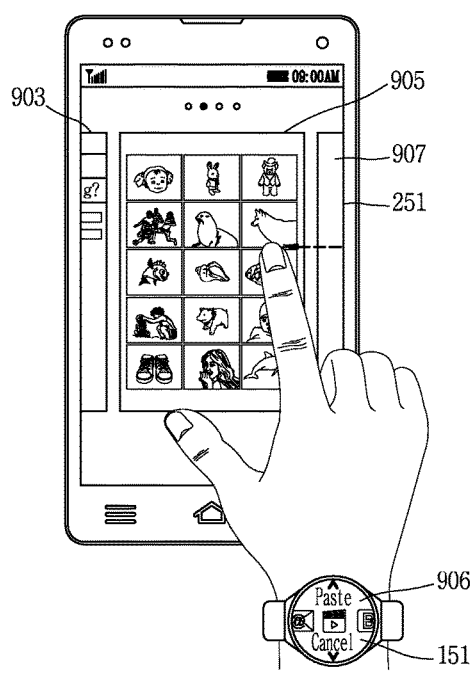
Figure 9C:
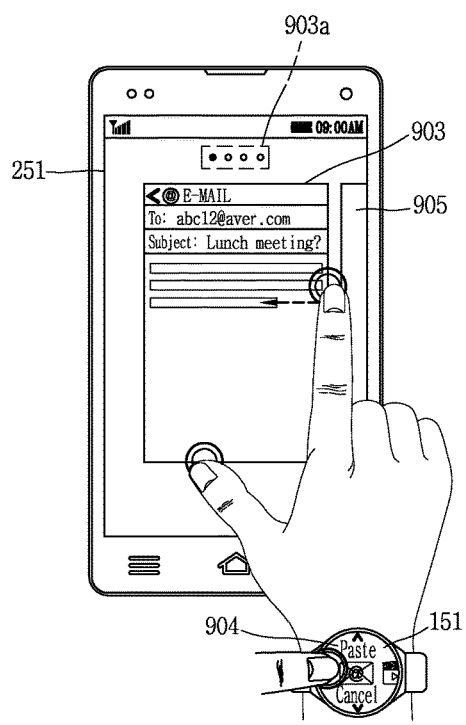

FIG. 8B (a) shows that a preview screen 804 corresponding to content information selected from the watch type terminal 100 is output to the display unit 251 of the external terminal 200, as a two-finger touch gesture is applied to the external terminal 200.

The controller 180 of the watch type terminal 100 may be configured to create a preview screen corresponding to data which has been taken from the external terminal 200, and store the preview screen in the memory 160 together with the data.

Specifically, the controller 180 may be configured to store preview data corresponding to clipped data in the form of meta data when storing the clipped data, and thereafter when an icon of an application corresponding to the above described content information is selected, to provide first a preview screen and when the preview screen is finally selected, to call and paste the clipped data connected to the preview screen to a position selected by a user. In this case, when a user moves the preview screen to the left or right (for instance, a swipe touch input) using one finger while another finger maintains a touched state, under a two-finger touch input applied to the external terminal 200, the current preview screen may be converted into a preview screen corresponding to clipped next content, or a current content screen may be immediately converted into a clipped next content screen.

As shown in FIG. 8B (a), in a state where the preview screen 804 is output, an input of a control command related to the preview screen 804 may be executed through the display unit 151 of the watch type terminal 100.

Specifically, the controller 180 of the watch type terminal 100 is configured to paste content information corresponding to the preview screen 804 to a paste region corresponding to a two-finger touch gesture when a first direction touch input (for instance, a flicking touch input toward a direction of the external terminal) (805*a*) while the preview screen (804) is output to the external terminal 200. Here, the paste region is a position corresponding to a two-finger touch gesture, which means a region where transmitted content information will be displayed.

On the paste region, as shown in FIGS. 8B (b) and (c), an editing mode may be executed with respect to transmitted content information by moving a two-finger touch gesture. For instance, it is possible to display transmitted content information in a zoom-in or zoom-out manner by widening or narrowing two fingers, or in a rotating manner by rotating the two fingers to the left and right.

While the editing mode is executed, edge images (807 and 807") each informing that the paste region is being adjusted, are output to the display unit 251 of the external terminal 200, and text indications (806 and 806") each corresponding to the adjusted paste region, are output to the display unit 151 of the watch type terminal 100. For instance, as shown in FIGS. 8B (b) and (c), in a case where the paste region is reduced, a text which is output to the display unit 151 of the watch type terminal 100 is displayed in a size-reduced form.

Here, in a case where an application identical to an application which corresponds to selected content information is executed at the external terminal 200, only the content information is pasted. Further, when an application identical to an application which corresponds to selected content information is not executed at the external terminal 200, the corresponding application is executed first and then the content information is pasted.

Further, when an application identical to an application which corresponds to selected content information is not installed in the external terminal 200, screen information introducing installation of the application is output, or only content information is pasted either to an execution screen of a memo application or an execution screen of an application which is being currently executed.

Next, when the two-finger touch gesture applied to the external terminal 200 is released, the paste function is terminated. As a result, as shown in FIG. 8B (d), content information is displayed on the finally selected paste region. When the two-finger touch gesture is terminated in a state where transmission of selected content information is not completed, part of transmitted data is damaged or a message inquiring as to whether or not to retransmit the data may be popped up on the display unit 251 of the external terminal 200.

In this case, when the watch type terminal 100 applies a swipe input toward the external terminal 200 in a state where a two-finger touch gesture is maintained at the external terminal 200 or in a case where a touch gesture is converted into a one finger operation state, a transmission command of the selected content information may be executed. In this case, it is possible to transmit the selected content information although the two-finger touch gesture or the one finger operation state is released before transmission of the selected content information is completed. Meanwhile, when a swipe input (for instance, a swipe input in a right direction) is applied to a displayed text or image in one direction according to a touch applied to the display unit 151 of the watch type terminal 100, transmission of the selected content information may be cancelled.

Meanwhile, though not shown, when a touch input of a second direction which is opposite to the touch input of the first direction is applied to the display unit 151 in a state where a preview screen 804 is output to the external terminal 200, the controller 180 may be configured to cancel paste of content information corresponding to the output preview screen 804. As a result, the preview screen 804 may disappear.

FIGS. 9(a) to 9(d) are exemplary schematic views illustrating a method to multi-select stored content information and paste the selected content information to the external terminal, by the watch type terminal according to the present invention.

As shown, when a reference time elapses in a state where a long press input has been applied to the display unit 151 of the watch type terminal 100, a selection screen (803) to select data clipped to the watch type terminal 100 is output, as shown in FIG. 9 (a). In this case, when a drag input rotating in one direction so that a plurality of icons of applications displayed on the selection screen (803) may be selected, is applied to icons (901a, 901b, 901c, and 901d) of applications, a plurality of content to be transmitted to the external terminal 200 are selected. As a result, as shown in FIG. 9 (b), a check box marked with 'x' or 'v' is displayed on each of the icons of the applications. Alternatively, though not shown, it is possible to multi-select the icons of the applications displayed on the selection screen 803 using a multi-touch input method or using one finger under a two-finger touch input.

When a two finger-touch input is applied to the display unit 251 of the external terminal 200 in a state where a plurality of content information are selected from the watch type terminal 100, a first preview screen (903) corresponding to firstly-selected content information is displayed on a paste region corresponding to the two-finger touch input. In this case, part of a second preview screen (905) corresponding to secondly-selected content information is displayed at a right side of the first preview screen (903). At an upper side of the first preview screen (903), an icon region (903a) informing a position of the preview screen which is being currently output, is displayed.

A user may control the next preview screen/previous preview screen to be output to the display unit 251 of the external terminal 200 by executing a flicking touch input in a desired direction to turn over, using one finger with one finger while another finger maintains a touched state under a two-finger touch input.

When the preview screen is turned over, an icon of an application which is output to the display unit 151 of the watch type terminal 100 is changed. For instance, as shown in FIGS. 9 (c) and (d), when an e-mail preview screen (903) is converted into a gallery preview screen (905), an e-mail icon (904) is converted into a gallery application icon (906) at the watch type terminal 100. During the turn-over of the preview screen, a touch input applied to the watch type terminal 100 may be maintained as shown in FIG. 9 (c), or may be released as shown in FIG. 9 (d). In this case, when a swipe input is applied in a preset direction (for instance, upper/lower direction) in a state where the preview screen (903) is output, a paste object may be deleted. That is, the preview screen disappears and the preview screen (905) corresponding to next clipped content may be output.

The controller 180 of the watch type terminal 100 is configured to paste content information corresponding to a preview screen to the external terminal 200 when an application corresponding to selected content information is pre-executed at the external terminal 200. Meanwhile, the controller 180 of the watch type terminal 100 is configured to execute an application corresponding to selected content information and then paste content information corresponding to a preview screen to the external terminal 200 when the application corresponding to the selected content information is not executed at the external terminal 200.

Meanwhile, when data being drafted exists at the external terminal 200 even in a case where an application corresponding to selected content information is being pre-executed at the external terminal 200, it is required to limit a paste operation in order to prevent any possible damage to information.

Figure 10A:
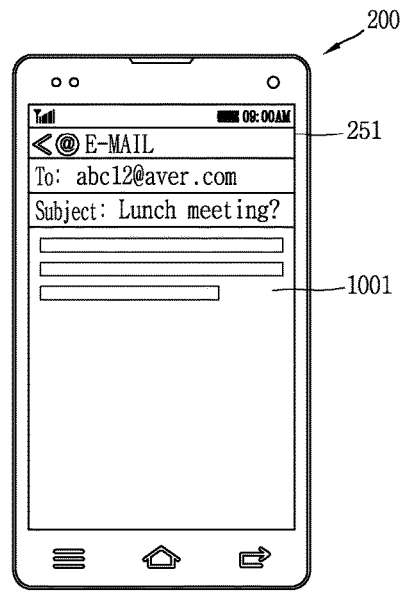
FIGS. 10A(a) to 10A(c) and 10B(a) to 10B(c) are exemplary schematic views illustrating a method to paste stored content information to an external terminal when the stored content information is identical to an application being executed at an external terminal, in a watch type terminal according to the present invention.
Figure 10A:
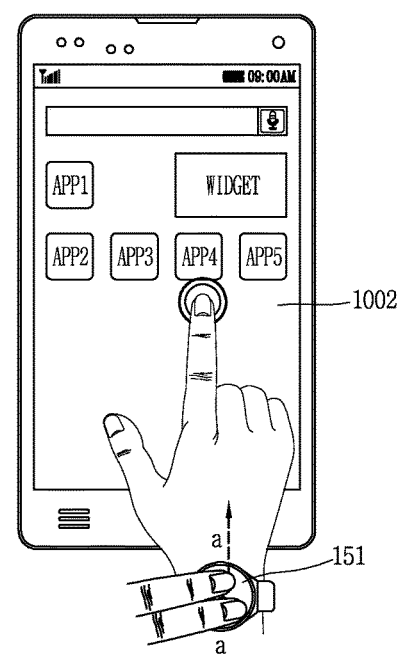
Figure 10A:
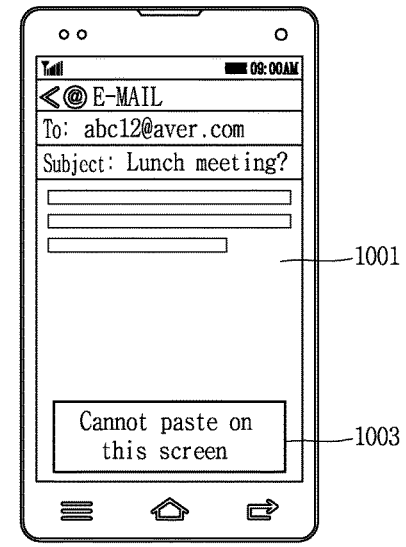
Figure 10B:
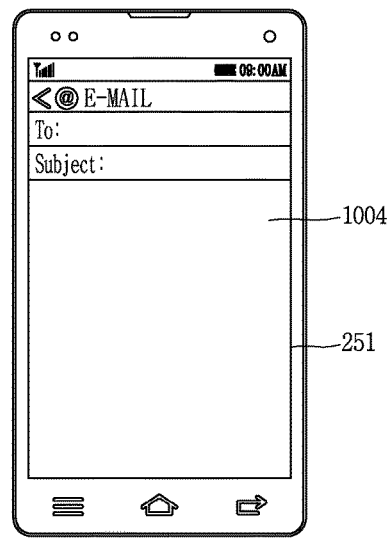
Figure 10B:
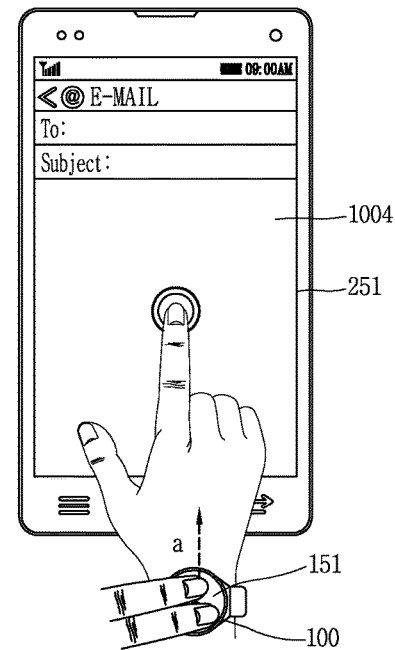
Figure 10B:
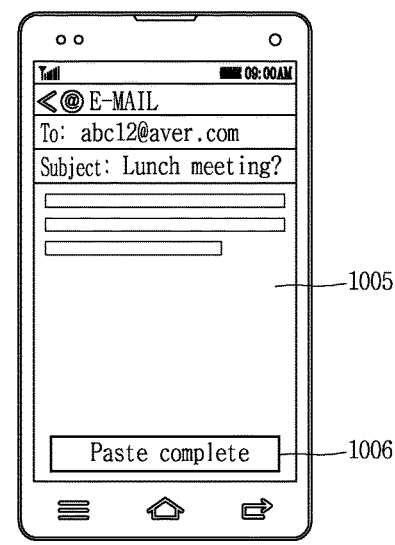

FIGS. 10A(a) to 10A(c) and 10B(a) to 10B(c) are views illustrating a method to paste content information clipped to the watch type terminal 100 to the external terminal 200 in a case where temporary data is drafted on an execution screen of an application which is being executed at the external terminal 200, according to an embodiment of the present invention. In FIGS. 10A and 10B, it is assumed that content information corresponding to an e-mail application is stored in the watch type terminal 100 as recent clipped data.

As shown in FIGS. 10A (a), when a control command is input so as to output a home screen page without terminating drafting of an e-mail (1001) at the external terminal 200, execution of an e-mail application is maintained at a background and the home screen page (1002) is displayed on the display unit 251 of the external terminal 200.

Under such a state, when a single touch is applied to the home screen page (1002) and a two-finger tap applied to the watch type terminal 100 is flicked in one direction (a) (a direction where the external terminal is positioned) while the two-finger tap is maintained at the display unit 151 of the watch type terminal 100, a paste event is generated.

In this case, since there is data being drafted on a recent executed screen of the e-mail application of the external terminal 200, the recent execution screen (1001) which was previously output is redisplayed on the display unit 251 of the external terminal 200, instead of a preview screen corresponding to selected content information. Further, an icon (1003), informing that data clipped to the watch type terminal 100 can not be pasted, is displayed on the recent execution screen (1001) at a lower end of the display unit 251. Thereby, data being drafted may not be damaged due to the paste. In this case, a popup window including a control command which induces a new screen to appear, may be output after the data being drafted is automatically stored.

Thereafter, a user applies a control command such that a new e-mail window (1004) is output to the display unit 251 of the external terminal 200, as shown in FIG. 10B (a), and then applies a single touch to the new e-mail window (1004) while maintaining a two-finger tap to the display unit 151 of the watch type terminal 100, as shown in FIG. 10B (b). When the two-finger tap applied to the watch type terminal 100 is flicked in one direction (a) (a direction where the external terminal is positioned), paste of recently clipped data is executed. That is, the recently clipped data is immediately pasted without a procedure to select content information to be transmitted from the watch type terminal 100 to the external terminal 200.

As a result, as shown in FIG. 10B (c), data clipped to the watch type terminal 100 is pasted to appear (1005) on the new e-mail window (1004), and an icon (1006) informing completion of the paste is displayed on the display unit 251 of the external terminal 200.

Meanwhile, it is possible to immediately paste data clipped to the watch type terminal 100 either when other functions are inactive rather than a function indicating time information on the display unit 151 because a battery amount of the watch type terminal 100 is less than a reference value, or when the display unit 151 is in an off-state.

Figure 11A:
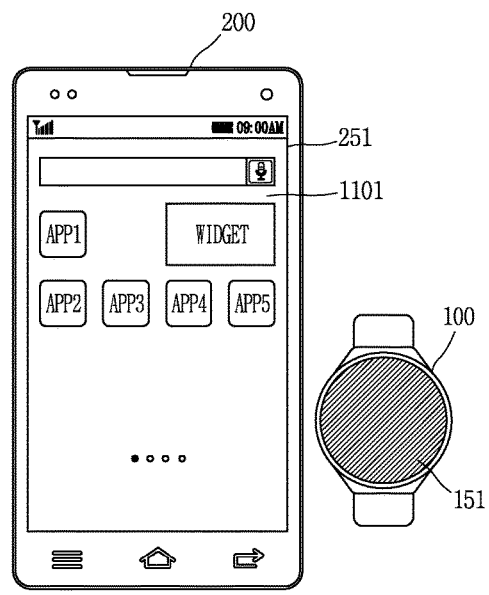
FIGS. 11A(a) to 11A(c) and 11B(a) to 11B(e) are exemplary schematic views illustrating a method to paste stored content information to an external terminal in an inactivated state of a watch type terminal according to the present invention.
Figure 11A:
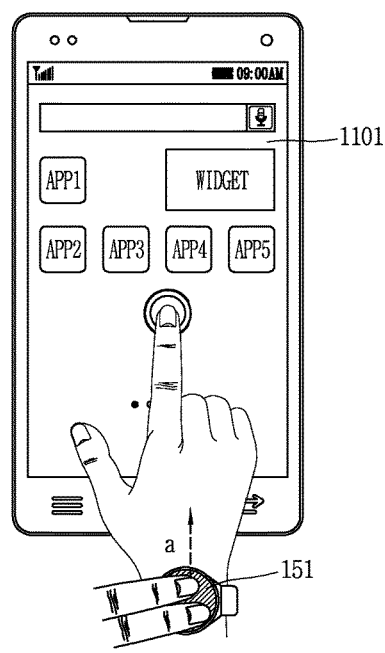
Figure 11A:
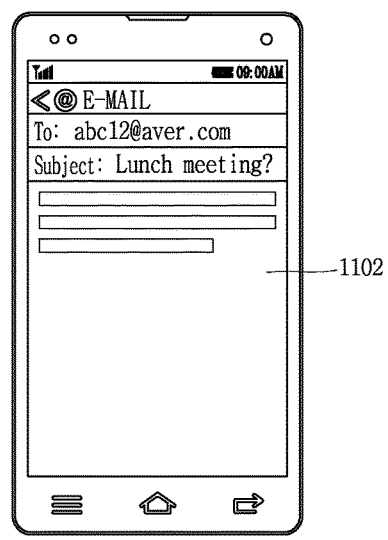
Figure 12A:
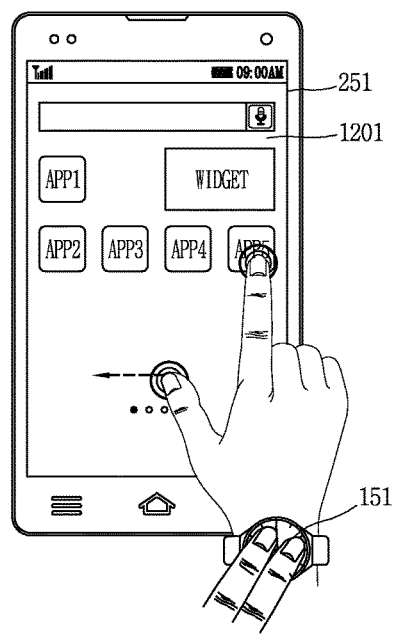
FIGS. 12(a) to 12(d) are exemplary schematic views illustrating a method to enter a preview mode of content information stored in a watch type terminal using a touch input applied to an external terminal, in a watch type terminal according to the present invention.
Figure 12B:
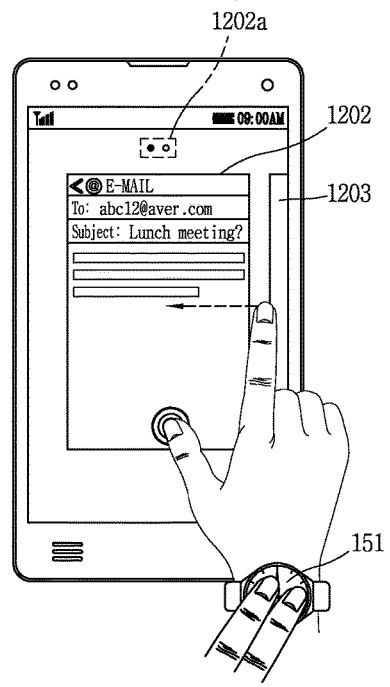
Figure 12D:
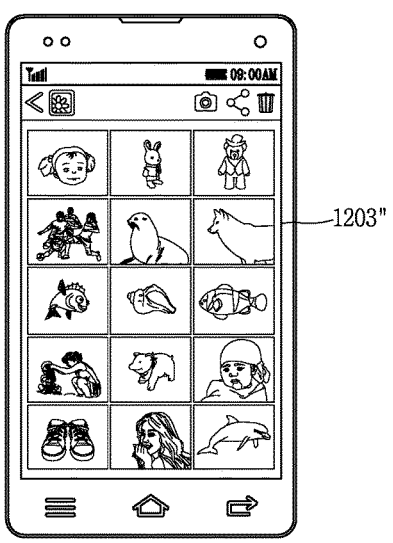
Figure 12C:
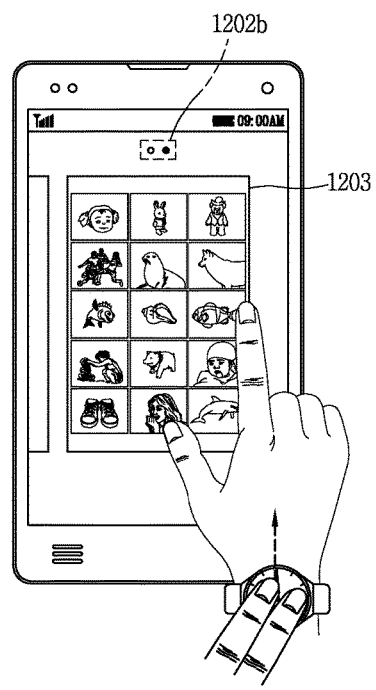
Figure 13A:
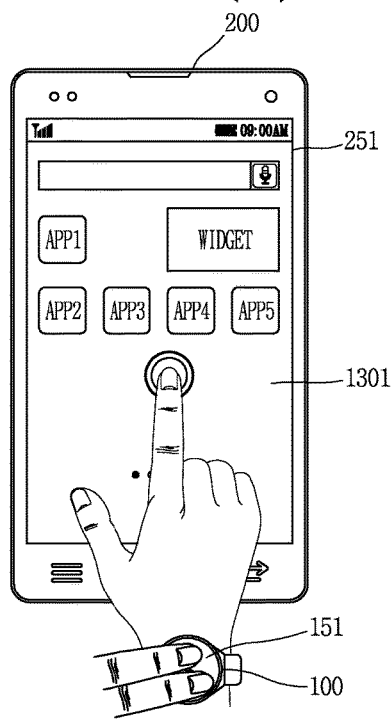
FIGS. 13(a) to 13(d) are exemplary schematic views illustrating a method to set a duration of content information using a touch input applied to the display unit, in a watch type terminal according to the present invention.
Figure 13B:
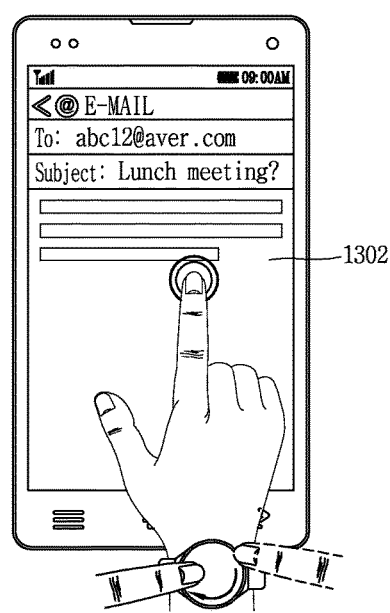
Figure 13D:
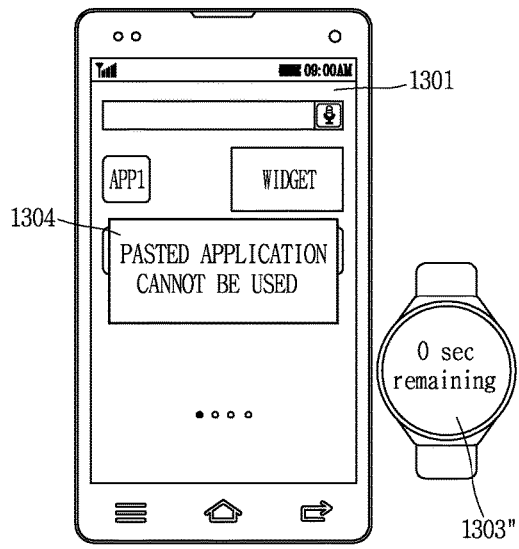
Figure 13C:
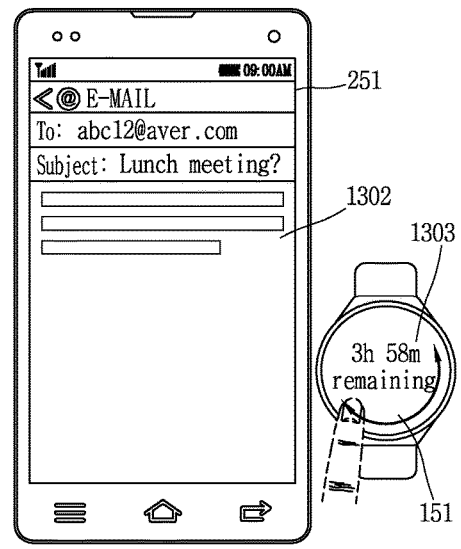
Figure 14A:
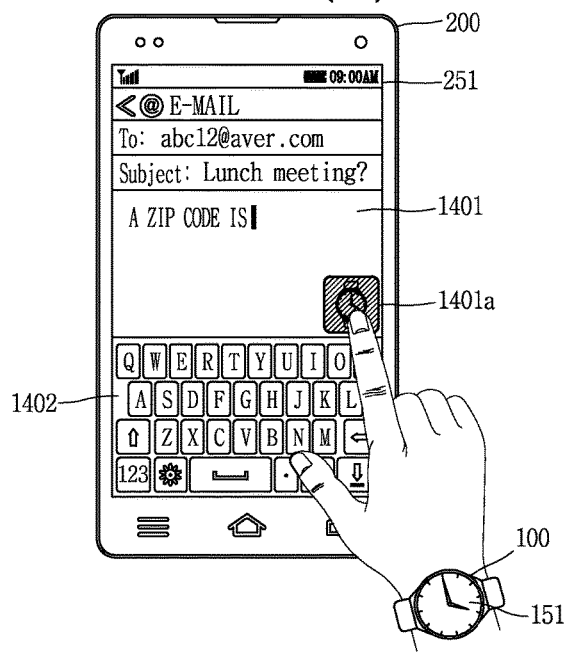
FIGS. 14(a) to 14(d) are exemplary schematic views illustrating a method to control content information using a touch region of an external terminal, in a watch type terminal according to the present invention.
Figure 14B:
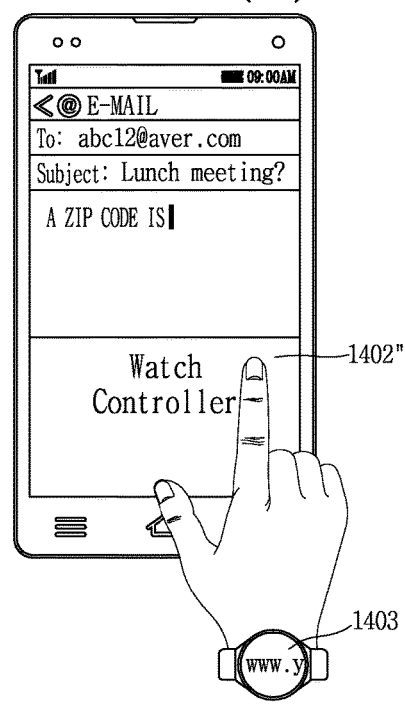
Figure 14D:
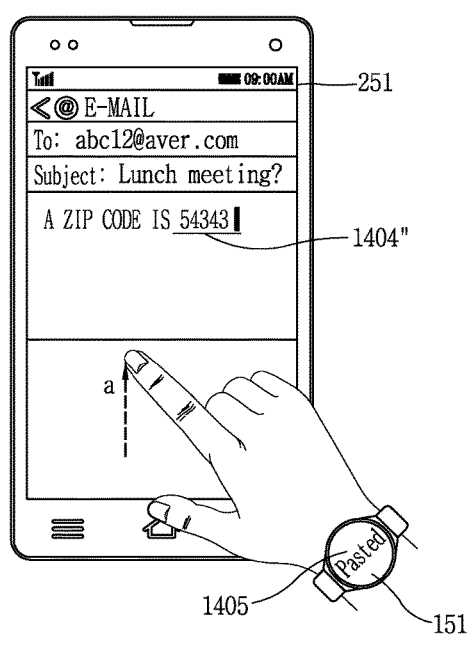
Figure 14C:
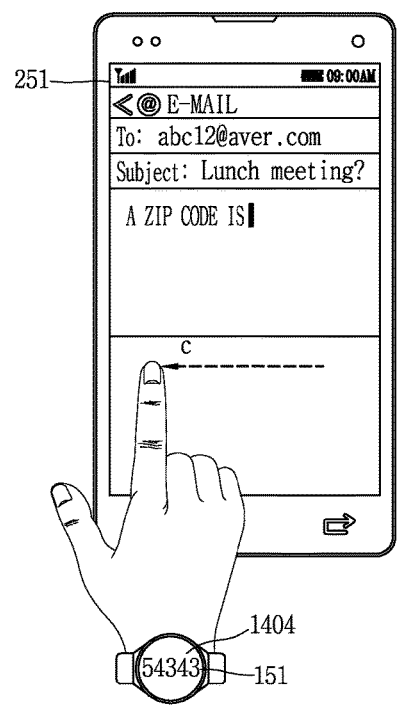
Figure 15A:
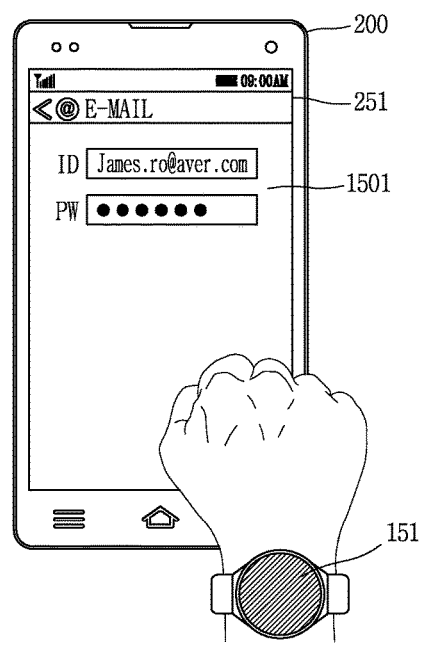
FIGS. 15(a) to 15(d) are exemplary schematic views illustrating a method to take personal information from an external terminal or to provide stored personal information to the external terminal using a proximity touch.
Figure 15B:
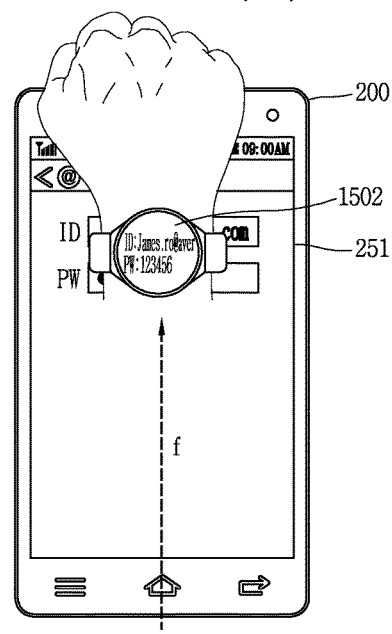
Figure 15D:
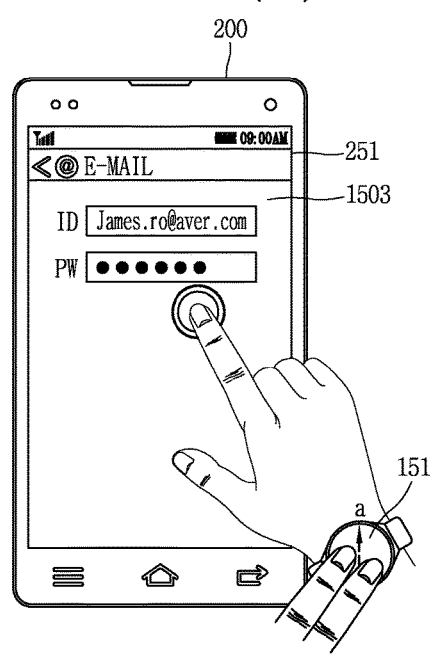
Figure 15C:
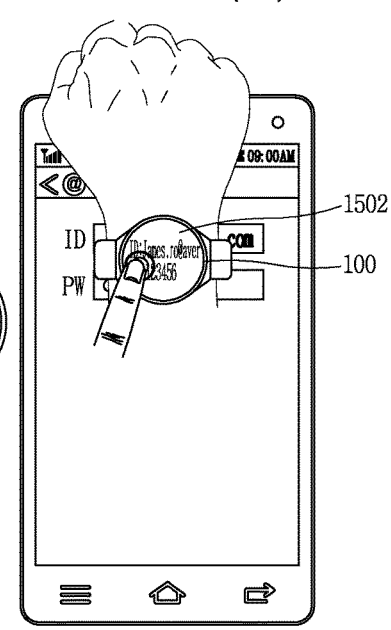

FIGS. 11A(a) to 11A(c) and 11B(a) to 11B(e) are exemplary views illustrating a method to paste stored content information to the external terminal 200 in a case where the display unit 151 of the watch type terminal 100 is in an off-state, according to the present invention.

To this end, the display unit 151 of the watch type terminal 100 may be configured to be convertible from one to another between an active state and an inactive state. Further, in a doze mode where the display unit 151 is inactive and a touch sensor provided in the display unit 151 is periodically active, the controller 180 may convert the doze mode into an active mode where the display unit and the touch sensor are activated when a preset touch input is sensed by the touch sensor. Alternatively, when a motion or a gesture indicating time information is input, the controller 180 may convert the doze mode into an active mode.

Specifically, the controller 180 may sense that a third input is applied to the display unit 151 in a state where the display unit 151 is inactivated, and a predetermined touch gesture is applied to the external terminal 200 within a reference time in a state where the third touch input is maintained. The third touch input is a touch input to convert the doze mode into an active mode, which may be a two-finger tap or a two-finger long tap, for instance.

As shown in FIGS. 11A (a) and 11A(b), a two-finger tap or a two-finger long tap is applied to the display unit 180 in a state where a home screen page (1101) is output to the display unit 251 of the external terminal 200 and the display unit 151 of the watch type terminal 100 is inactivated, and then a single touch is applied to the display unit 251 of the external terminal 200. Under such a state, when the two-finger tap or two-finger long tap applied to the display unit 151 is flicked in a direction (a) where the external terminal 200 is positioned, content information which has been recently clipped to the watch type terminal 100 is pasted to the external terminal 200. In this case, when the input applied to the display unit 151 is a two-finger tap, it may be requested to execute an additional swipe input.

As a result, as shown in FIG. 11A (c), drafted data is displayed (1102) on the display unit 251 of the external terminal 200 together with an execution screen of an e-mail application, as content information recently clipped to the watch type terminal 100. In this case, no screen information may be output to the display unit 151 of the watch type terminal 100.

As another example, when a third touch input (a two-finger tap or two-finger long tap) is applied to the display unit 151 and a reference time lapses in a state where the display unit 151 is in an off-state, the controller 180 may convert the doze mode into an active mode and output a screen to select clipped data to the display unit 151.

For instance, as shown in FIG. 11B(a) to 11B(e), when a reference time (for instance, two seconds) elapses in a state where a two-finger tap or a two-finger long tap has been applied to the display unit 151 of the watch type terminal 100, the current screen is converted into a clipboard screen to select clipped data, as shown in FIG. 11B (b).

On the clipboard screen, icons of applications are displayed in order that the content information has been clipped. As a flicking touch input is applied to the clip board screen, an icon 1103a of an application which is output to the clip board screen is turned to an icon 1103b of a next application.

As shown in FIGS. 11B (b) and (c), when a single touch is input to the display unit 251 of the external terminal 200 and a flicking of a two-finger tap or a two-finger long tap in a direction (a) toward the external terminal 200 is sensed in a state where the icon 1103b of the application of desired content information is displayed and the two-finger tap or the two-finger long tap is re-applied to the display unit 151, the controller 180 is configured to control such that content information (for instance, an execution screen of an e-mail application and drafted data) corresponding to the selected icon of the application is pasted to the external terminal 200 (1105), as shown in FIG. 11B (e).

FIGS. 12(a) to 12(d) are exemplary views illustrating a method to directly enter a preview mode of content information stored in the watch type terminal 100 using a touch input to the external terminal 200, according to the present invention. Here, it is assumed that content information which corresponds to an e-mail application and a gallery application is stored in order in the watch type terminal 100.

As shown in FIG. 12 (a), when a two-finger tap or a two-finger long tap is applied to the display unit 151 of the watch type terminal 100, in a state where, for instance, a home screen page (1201) is output to display unit 251 of the external terminal 200, entry to paste is prepared, and in such a state, when a two-finger touch gesture is applied to the display unit 251 of the external terminal 200, the external terminal 200 enters a preview mode and a preview screen of content information stored in the watch type terminal 100 is output to the display unit 251 of the external terminal 200. Meanwhile, when a two-finer tap or a two-finger long tap is applied to the display unit 151 of the watch type terminal 100, and thereafter a swipe input (for instance, a swipe input in a direction toward an external terminal or a left/right swipe input) is subsequently applied to the display unit 151 in one direction, content information stored in the watch type terminal 100 is directly pasted to the external terminal 200.

Then, as shown in FIG. 12 (b), the home screen page (1201) is converted into a preview screen (1202) of content information corresponding to an e-mail application. In this case, at least part of a next preview screen (1203) is output to a right side of the output preview screen (1202), and an icon region (1202a) which informs a position of the preview screen being currently output is output to an upper side of the preview screen (1202).

Here, as shown in FIG. 12 (b), when a flicking touch input is applied in a desired direction using one finger with another finger maintained under a two-finger touch gesture, the next preview screen (1203) is output to the display unit 251 of the external terminal 200, as shown in FIG. 12 (c), and the icon region (1202a) is also changed accordingly.

In this case, the controller 180 of the watch type terminal 100 is configured to output an icon of a first application corresponding to the first preview screen (1202) on the display unit 151 of the watch type terminal 100 while the first preview screen (1202) is output to the external terminal 200. And when the first preview screen (1202) is converted into the second preview screen (1203) according to a movement of the above described touch gesture, an icon of a second application corresponding to the second preview screen (1203) is output to the display unit 151 of the watch type terminal 100.

Next, the controller 180 is configured to paste content information corresponding to a preview screen which was being output to the external terminal 200 to the watch type terminal 100, at the time when a touch gesture applied to the external terminal 200 is released. For instance, when a touch gesture is released while the preview screen (1203) of a gallery application is displayed as shown in FIG. 12 (c), content information corresponding to the preview screen is pasted (1203"), as shown in FIG. 12 (d).

Meanwhile, though not shown, when a preset touch input (for instance, a flicking touch input to the right or a horizontal direction) is applied to the display unit 151 of the watch type terminal 100, the controller 180 is configured to convert an icon of the first application into an icon of the second application to be next clipped.

Further, in response to the conversion of the icon of the first application into the icon of the second application, the controller 180 is configured to control such that the second preview screen (1203) corresponding to the icon of the second application is output to the display unit 251 of the external terminal 200.

In this case, content information corresponding to a preview screen which was being output to the external terminal 200 is pasted to the external terminal 200, at the time when a touch gesture applied to the external terminal 200 is released.

FIGS. 13(*a*) to 13(*d*) are exemplary views illustrating a method to set such that a pasted application is used at the external terminal during a prescribed time when data clipped to the watch type terminal is pasted. That is, FIGS. 13(*a*) to 13(*d*) illustrate an example of a method to set a duration with respect to content information to be pasted.

The method to set a duration with respect to content information to be pasted can be implemented by adding another touch pattern or replacing by another touch pattern at the time when data clipped to the watch type terminal 100 is pasted. In FIGS. 13(*a*) to 13(*d*), it is assumed that e-mail content information is clipped to the watch type terminal.

As shown in FIG. 13 (*a*), when a single touch is applied to the display unit 251 of the external terminal 200 in a state where a two-finger tap is applied to the display unit 151 of the watch type terminal 100, or a two-finger tap is flicked at the watch type terminal 100 in a prescribed direction after a single touch is applied to the display unit 251 of the external terminal 200, a preview screen (1302) of e-mail content information is displayed on the display unit 251 of the external terminal 200, as shown in FIG. 13 (*b*).

In this case, when a user applies a drag input which rotates in one direction (for instance, to the left or right) using one finger with at least another finger maintained under a two-finger tap applied to the watch type terminal 100, on an edge region of the display unit 151 of the watch type terminal 100, a duration setting mode is entered. As a result, as shown in FIG. 13 (*c*), screen information for setting a usable time of the preview screen (1302) displayed on the display unit 251 of the external terminal 200, or setting information on a usable time may be output to the display unit 151 of the watch type terminal 100.

Under the state, when a user extends the drag input which has been rotated in one direction to the same direction, the usable time (for instance, three hours and fifty eight minutes) is prolonged, and when the drag input is extended to the opposite direction, the usable time (for instance, three hours and fifty eight minutes) is shortened. That is, the usable time of the preview screen (1302) in the duration setting mode may be determined in proportion to a length of a drag input which has rotated in one direction.

In this case, a length of the drag input may be controlled using another finger in a state where one finger touch input which has been previously applied is maintained, or by additionally applying a drag input within a reference time (for instance, within 1~2 seconds) after releasing one finger touch input which has been previously applied.

Under such a state, when a user releases the touch input applied to the display unit 151 of the watch type terminal 100, the duration setting mode is released and content information corresponding to the preview screen (1302) is pasted to the external terminal 200. Then, when the set time has elapsed (1303"), as shown in FIG. 13 (*d*), the e-mail content information (1302) is converted into the previous screen (for instance, a home screen page), and an icon informing that the pasted application can not be used is popped up on the display unit 251 of the external terminal 200.

According to the aforementioned embodiments of the present invention, since a third party uses pasted application information for a prescribed time and then the application information is automatically deleted, it is convenient to manage information. Such an embodiment may be efficiently utilized in screen information which requires a release of a lock screen or a login.

FIGS. 14(*a*) to 14(*d*) are exemplary views illustrating a method to control display of content information to be pasted using a touch region of the external terminal, according to the present invention.

As the watch type terminal 100 is put on a wrist of a user, the display unit 151 has a limitation in size. Thus, there is also a limitation to control an output screen using a touch input to the display unit 151. Especially, in a case where there are many items or data to be pasted, it is much difficult to control a screen using such a small sized display unit.

Thus, as shown in FIG. 14 (*a*), when it is sensed that e-mail content information is clipped to the watch type terminal 100, in a case where e-mail screen information is output to an upper end of the display unit 251 of the external terminal 200 and an input region (for instance, a virtual keyboard region) (1402) is output to a lower end of the display unit 251, a menu icon (1401*a*) to use the input region (1402) as a screen control region of the watch type terminal 100 is displayed close to the input region (1402) or in an overlapped manner.

In this case, it is possible to implement such that the menu icon (1401*a*) is displayed when a preset condition is satisfied. For instance, the menu icon (1401*a*) can be displayed under conditions that there exists content clipped to the watch type terminal 100 within a predetermined time (for instance, within twelve hours) by reversely calculating from the current time, and the external terminal 200 is in a state to receive a text (for instance, a text input cursor is in an active state).

Though not shown, for instance, it may be configured to implement such that clipped content which exists in the watch type terminal 100 is displayed on the external terminal 200, in a case where a clip board function of the external terminal 200 is activated through a user input.

When a touch input is applied to the menu icon (1401*a*), the input region (1402) is converted into a screen control region (1402") for controlling the watch type terminal 100. As a result, as shown in FIG. 14 (*b*), the virtual keyboard disappears, and an indication informing that a screen control of the watch type terminal 100 is possible is displayed.

In this case, a user may execute a control function such as a turn-over of a screen or a call while moving, through the screen control region (1402"), while confirming screen information without blocking screen information which is output to the display unit 151 of the watch type terminal 100. For instance, as shown in FIG. 14 (*c*), when a drag input (c) to a left direction is sensed on the screen control region (1402"), next content information (for instance, a zip code) (1404) is output to the display unit 151. And when a drag input (a) to an upper direction is sensed on the screen control region (1402"), the selected content information (1404) is pasted (1404").

Thus, it is possible to control or paste data clipped to the watch type terminal 100 without blocking the small-sized display unit 151.

FIGS. 15(a) to 15(d) are views illustrating another embodiment of the watch type terminal according to the present invention, which shows an example of a method to take personal information from an external terminal or to provide stored personal information to the external terminal, using a proximity touch.

As part of the embodiment of the flowchart of FIG. 3, shown is an embodiment in which personal information such as a password or an identification (ID) is copied or pasted, considering a private characteristic of the watch type terminal 100.

As shown in FIG. 15 (a), when a user takes the watch type terminal 100 near the display unit 251 of the external terminal 200 in a state where login information is output to the display unit 251, input ID information and masked password information are displayed on the display unit 151 of the watch type terminal 100 in an unmasked state, as shown in FIG. 15 (b). Under such a state, when the user applies a preset touch input (for instance, a long press touch input) to the display unit 151 as shown in FIG. 15 (c), the displayed login information is clipped.

Thereafter, when the user takes the watch type terminal 100 near a display unit of another terminal and then flicks in one direction (a) in a state where the user wears the watch type terminal 100, input ID information and masked password information are automatically input, as shown in FIG. 15 (d). Thus, since it is possible to use the data clipped to the watch type terminal 100 as a key chain, a user's convenience can be enhanced.

As described above, according to the watch type terminal and a method of control the same, it is possible to take promptly content information included in a selected copy region on an external terminal, by applying a touch input to a display unit of the watch type terminal, while the copy region is continuously selected. Further, it is possible to paste content information stored in the watch type terminal to an external terminal using a touch input to a display unit of the watch type terminal. In this case, the content information may include not only content information included in the copy region, but information related to an application. According to this, since an application which corresponds to the stored content information is executed when pasting the content information to the external terminal, a user's convenience can be enhanced. Further, content information taken from an external terminal is assigned and displayed on a display region which corresponds to a current time. Thus, since it is possible to visually discriminate a time when content information has been stored from a time when content information has not been stored, it is possible to perceive when the content information was stored and also it is possible to easily search desired content information. Further, it is possible to paste immediately content information which has been recently stored using one touch input to an external terminal. Also, since a number of steps to be taken are not required to execute a paste function, a user's convenience can be enhanced.

As described above, the present invention is capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the controller 180 of the computer terminal may be included.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type terminal comprising:
    a main body;
    a wireless communication module configured to transmit data to an external terminal or receive data from the external terminal;
    a touch screen configured to receive a touch input and display a time screen indicating current time, wherein the time screen comprises a plurality of regions along edges of the time screen, each corresponding to a time; and
    a hardware controller configured to:
    output to the touch screen information indicating that content information, corresponding to a copy region selected at the external terminal, can be stored in the watch type terminal when a first touch input is applied to the touch screen,
    store the content information together with corresponding metadata including information of an application of the content information and a preview screen corresponding to the content information in the watch type terminal when a second touch input is applied to the touch screen,
    display an icon of the application of the stored content information on one region corresponding to time when the content information has been stored, of the plurality of regions of the time screen,
    call the stored content information and the corresponding metadata in response to a third touch input applied to the icon displayed on the time screen,
    transmit data related to the preview screen included in the called metadata to the external terminal in response to a paste gesture applied to the external terminal,
    display information on the touch screen corresponding to editing a paste region on which the preview screen is displayed at the external terminal while the paste gesture is moved, and
    if the paste gesture applied to the external terminal is released, transmit a control command to the external terminal such that the stored content information is displayed on the edited paste region.

2. The watch type terminal of claim 1, wherein the hardware controller is further configured to control the wireless communication module to receive the content information corresponding to the selected copy region when a touch gesture is continuously applied to the external terminal and when the second touch input is released.

3. The watch type terminal of claim 2, wherein the content information relates to an application in the selected copy region of the external terminal.

4. The watch type terminal of claim 1, wherein the hardware controller is further configured to store a plurality of content information in the watch type terminal at the same region, and wherein the icon comprises the number of content information stored.

5. The watch type terminal of claim 4, wherein the hardware controller is further configured to convert the icon into a plurality of movable sub-icons when a fourth touch input is applied to the touch screen over the icon, and to move the content information corresponding to one of the plurality of sub-icons to a location corresponding to another one of the plurality of regions when a drag input is applied to move the one sub-icon.

6. The watch type terminal of claim 1, wherein the hardware controller is further configured to recognize a change in the selected copy region, and content information corresponding to the selected copy region, in response to a change in the selected copy region at the external terminal while the first touch input is maintained, and to store the content information corresponding to the changed copy region, when the second touch input is applied to the touch screen.

7. The watch type terminal of claim 1, wherein the hardware controller is further configured to change content information stored in the watch type terminal into a transmittable state when a fourth touch input is applied to the touch screen, and to transmit the stored content information to the external terminal while a touch gesture is maintained at the external terminal.

8. The watch type terminal of claim 7, wherein an indication is displayed on one region of the plurality of regions corresponding to the stored content information, and wherein the stored content information to be transmitted is selected when the fourth touch input is applied to the indication corresponding to the stored content information.

9. The watch type terminal of claim 1, wherein the hardware controller is further configured to cancel paste operation when a cancel paste touch gesture is applied to the touch screen while the paste gesture is maintained at the external terminal.

10. The watch type terminal of claim 1, wherein the stored content information is pasted to the external terminal when an application corresponding to the stored content information is executed at the external terminal.

11. The watch type terminal of claim 1, wherein the hardware controller is further configured to paste the stored content information to the external terminal after executing an application corresponding to the stored content information.

12. The watch type terminal of claim 1, wherein the hardware controller is further configured to display an icon on the touch screen corresponding to a first application while a first preview screen is displayed on the external terminal, and wherein a plurality of content information is stored at the watch type terminal, the hardware controller is further configured to display an icon on the touch screen corresponding to a second application, wherein the first preview screen displayed on the external terminal is converted into a second preview screen.

13. The watch type terminal of claim 12, wherein the hardware controller is further configured to convert the icon corresponding to the first application into the icon corresponding to the second application when a preset touch input is applied to the touch screen and the first preview screen is displayed on the external terminal, and configured to control the wireless communication module to transmit a control command to the external terminal such that the second preview screen is displayed on the external terminal in response to the conversion of the icon corresponding to the first application into the icon corresponding to the second application.

14. The watch type terminal of claim 1, wherein the hardware controller is further configured to display, on the touch screen, information for setting a time for the preview screen when a fourth touch input is applied to the touch screen and a drag input is applied along a curved path at an edge region of the touch screen, and wherein the time is proportional to the length of the curved path.

15. The watch type terminal of claim 1, wherein the hardware controller is further configured to control a plurality of devices connected to the external terminal, to control the external terminal to display a list of the plurality of devices and to remove the displayed list when the first touch input is applied to the touch screen and the selection of the copy region is maintained at the external terminal, and configured to initiate copying of content information corresponding to the copy region to a selected one of the plurality of devices connected to the external terminal.

16. The watch type terminal of claim 1,
wherein the touch screen is further figured to transition between an on state and an off-state, and
wherein the hardware controller is further configured to control a preview screen corresponding to recently-stored content information, to be displayed on the external terminal while a fourth touch input is applied to the touch screen in the off-state and a touch gesture is applied to the external terminal within a reference time, to convert the off-state of the touch screen into an on-state when the fourth touch input is applied to the touch screen in the off-state, and to display an icon of an application corresponding to the recently-stored content information to the touch screen.

17. The watch type terminal of claim 2, wherein the content information includes anyone of, or a combination of text, an image, audio and video corresponding to the selected copy region of the external terminal.

* * * * *